US012711215B2

(12) United States Patent
Kawasaki

(10) Patent No.: US 12,711,215 B2
(45) **Date of Patent: *Aug. 18, 2026**

(54) AUTHENTICATION TERMINAL, SYSTEM, CONTROL METHOD OF AUTHENTICATION TERMINAL, AND STORAGE MEDIUM

(71) Applicant: NEC Corporation, Tokyo (JP)

(72) Inventor: Daisuke Kawasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

This patent is subject to a terminal disclaimer.

(21) Appl. No.: 18/691,551

(22) PCT Filed: Sep. 30, 2021

(86) PCT No.: PCT/JP2021/036191

§ 371 (c)(1),
(2) Date: Mar. 13, 2024

(87) PCT Pub. No.: WO2023/053362

PCT Pub. Date: Apr. 6, 2023

(65) Prior Publication Data

US 2024/0386088 A1 Nov. 21, 2024

(51) Int. Cl.
*G06F 21/32* (2013.01)

(52) U.S. Cl.
CPC .................................... *G06F 21/32* (2013.01)

(58) Field of Classification Search
CPC ........................................................ G06F 21/32
See application file for complete search history.

(56) References Cited

U.S. PATENT DOCUMENTS

2014/0310801 A1* 10/2014 Juhani ..................... G06F 21/32 726/19
2016/0050324 A1 2/2016 Oshita et al.
(Continued)

FOREIGN PATENT DOCUMENTS

JP 2003-331323 A 11/2003
JP 2005-252621 A 9/2005
(Continued)

OTHER PUBLICATIONS

International Search Report for PCT Application No. PCT/JP2021/036191, mailed on Dec. 28, 2021.
(Continued)

*Primary Examiner* — Brian Whipple
(74) *Attorney, Agent, or Firm* — Sughrue Mion, PLLC

(57) ABSTRACT

Authentication terminal includes first acquisition unit, second acquisition unit, authentication unit, and service providing unit. The first acquisition unit acquires first biometric information of user and determining data to determine whether or not to provide service when distance between own terminal and the user reaches first distance. The second acquisition unit acquires second biometric information of the user when the distance between own terminal and the user reaches second distance. The authentication unit authenticates the user based on first verification using the first biometric information and the second biometric information and second verification using the determining data. The service providing unit provides the service to person who has been successfully authenticated when result of authentication is successful. When the result of the authentication is failure, the service providing unit determines action to be taken according to which of the first verification or the second verification has failed.

12 Claims, 21 Drawing Sheets

(56) References Cited

U.S. PATENT DOCUMENTS

| | | | | |
|---|---|---|---|---|
| 2018/0181737 | A1* | 6/2018 | Tussy | G06V 40/20 |
| 2020/0118572 | A1* | 4/2020 | Bae | G06F 21/32 |
| 2020/0382307 | A1* | 12/2020 | Yoon | G06Q 20/401 |
| 2021/0117980 | A1* | 4/2021 | Choi | G06Q 30/02 |
| 2021/0150239 | A1* | 5/2021 | Yoon | G06V 40/1312 |
| 2022/0101674 | A1 | 3/2022 | Tsukidate | |
| 2022/0309138 | A1* | 9/2022 | Chae | G06F 21/35 |
| 2023/0237862 | A1 | 7/2023 | Kawase | |

FOREIGN PATENT DOCUMENTS

| | | | |
|---|---|---|---|
| JP | 2016-042668 | A | 3/2016 |
| JP | 2018-190051 | A | 11/2018 |
| JP | 2020-064541 | A | 4/2020 |
| JP | 6765777 | B1 | 10/2020 |
| JP | 6838689 | B1 | 3/2021 |
| WO | 2016/035402 | A1 | 3/2016 |

OTHER PUBLICATIONS

Written opinion for PCT Application No. PCT/JP2021/036191, mailed on Dec. 28, 2021.

* cited by examiner

AUTHENTICATION SYSTEM
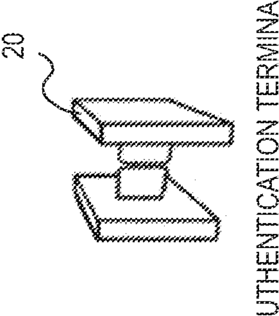
FIG.2
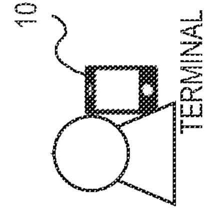

DATABASE OF PERSON TO BE MATCHED

| BIOMETRIC INFORMATION | DETERMINING DATA TO DETERMINE WHETHER OR NOT TO PROVIDE SERVICE |
|---|---|
| FV01 | D01 |
| FV02 | D02 |
| FV03 | D03 |
| FV04 | D04 |
| ⋮ | ⋮ |

FIG.8

OUTPUT MESSAGE

THANK YOU FOR VISITING.
PLEASE PROCEED THROUGH THE GATE.

OUTPUT MESSAGE

A VALID NEGATIVE CERTIFICATE MUST BE PRESENTED TO PASS THROUGH THE GATE.

YOU CAN TAKE A TEST TO ACQUIRE A NEGATIVE CERTIFICATE AT THE ADJACENT BOOTH.

FIG.13

AUTHENTICATED PERSON INFORMATION DATABASE

| USER ID | BIOMETRIC INFORMATION | DETERMINING DATA TO DETERMINE WHETHER OR NOT TO PROVIDE SERVICE |
|---|---|---|
| uID11 | FV11 | D11 |
| uID12 | FV12 | D12 |
| uID13 | FV13 | D13 |
| uID14 | FV14 | D14 |
| ⋮ | ⋮ | ⋮ |

FIG.18

AUTHENTICATION TERMINAL, SYSTEM, CONTROL METHOD OF AUTHENTICATION TERMINAL, AND STORAGE MEDIUM

This application is a National Stage Entry of PCT/JP2021/036191 filed on Sep. 30, 2021, the contents of all of which are incorporated herein by reference, in their entirety.

TECHNICAL FIELD

The present invention relates to an authentication terminal, a system, a control method of an authentication terminal, and a storage medium.

BACKGROUND ART

Various services using biometric authentication are provided.

For example, Patent Literature 1 describes providing an automatic gate system that allows a user to pass through a gate without having to take any action, such as holding up a card or the like, when the user passes through the gate. The automatic gate system of Patent Literature 1 receives data from a user apparatus when a user carrying the user apparatus storing pass-through authority data and face data enters a communication area of a wireless communication unit, and stores these data and a result of determining whether the pass-through authority data is valid or invalid in a data storage unit. When the user passes through the gate, the automatic gate system identifies the user by matching face data acquired from a face image captured by a camera and face data stored in the data storage unit in a user authentication unit. The automatic gate system permits the user to pass through the gate when a result of determining the pass-through authority data of the identified user is valid.

CITATION LIST

Patent Literature

[PTL 1] Japanese Unexamined Patent Application Publication No. JP2003-331323

SUMMARY OF INVENTION

Technical Problem

The automatic gate system disclosed in Patent Literature 1 determines whether to permit or reject a user to pass through based on the validity or invalidity of the pass-through authority data of the user. Here, the automatic gate system only rejects the user who does not possess valid pass-through authority data to pass through the gate. In other words, since there is no guidance for the user who has failed to pass through the gate, the user who has failed to pass through the gate cannot know what action to take after that.

It is a main object of the present invention to provide an authentication terminal, a system, a control method of an authentication terminal, and a storage medium that contribute to improving a convenience of a user.

Solution to Problem

According to a first aspect of the present invention, there is provided an authentication terminal, including: a first acquisition unit that acquires first biometric information of a user and determining data to determine whether or not to provide a service to the user from another apparatus when a distance between own terminal and the user reaches a first distance; a second acquisition unit that acquires second biometric information of the user when the distance between the own terminal and the user reaches a second distance; an authentication unit that authenticates the user based on a first verification using the first biometric information and the second biometric information and a second verification using the determining data; and a service providing unit that provides the service to a person who has been successfully authenticated when a result of an authentication is successful, and determines an action to be taken for a person who has failed in the authentication according to which of the first verification or the second verification has failed when the result of the authentication is unsuccessful.

According to a second aspect of the present invention, there is provided a system, including: a terminal possessed by a user; and an authentication terminal, wherein the authentication terminal, including: a first acquisition unit that acquires first biometric information of the user and determining data to determine whether or not to provide a service to the user from the terminal when a distance between own terminal and the user reaches a first distance; a second acquisition unit that acquires second biometric information of the user when the distance between the own terminal and the user reaches a second distance; an authentication unit that authenticates the user based on a first verification using the first biometric information and the second biometric information and a second verification using the determining data; and a service providing unit that provides the service to a person who has been successfully authenticated when a result of an authentication is successful, and determines an action to be taken for a person who has failed in the authentication according to which of the first verification or the second verification has failed when the result of the authentication is unsuccessful.

According to a third aspect of the present invention, there is provided a control method of an authentication terminal, the control method including: acquiring first biometric information of a user and determining data to determine whether or not to provide a service to the user from another apparatus when a distance between own terminal and the user reaches a first distance; acquiring second biometric information of the user when the distance between the own terminal and the user reaches a second distance; authenticating the user based on a first verification using the first biometric information and the second biometric information and a second verification using the determining data; and providing the service to a person who has been successfully authenticated when a result of an authentication is successful, and determining an action to be taken for a person who has failed in the authentication according to which of the first verification or the second verification has failed when the result of the authentication is unsuccessful.

According to a fourth aspect of the present invention, there is provided a computer-readable storage medium, storing a program causing a computer mounted on an authentication terminal to perform processing for: acquiring first biometric information of a user and determining data to determine whether or not to provide a service to the user from another apparatus when a distance between own terminal and the user reaches a first distance; acquiring second biometric information of the user when the distance between the own terminal and the user reaches a second distance; authenticating the user based on a first verification using the first biometric information and the second biometric information and a second verification using the determining data;

and providing the service to a person who has been successfully authenticated when a result of an authentication is successful, and determining an action to be taken for a person who has failed in the authentication according to which of the first verification or the second verification has failed when the result of the authentication is unsuccessful.

Advantageous Effects of Invention

According to the individual aspects of the present invention, there is provided an authentication terminal, a system, a control method of an authentication terminal, and a storage medium, which contribute to improving a convenience of a user. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 2 is a diagram illustrating an example of a schematic configuration of an authentication system according to a first example embodiment.

FIG. 8 is a diagram illustrating an example of a database of person to be matched according to the first example embodiment.

FIG. 13 is a diagram illustrating an example of a display of the terminal according to a variation of the first example embodiment.

FIG. 18 is a diagram illustrating an example of an authenticated person information database according to the second example embodiment.

EXAMPLE EMBODIMENT

Figure 1:
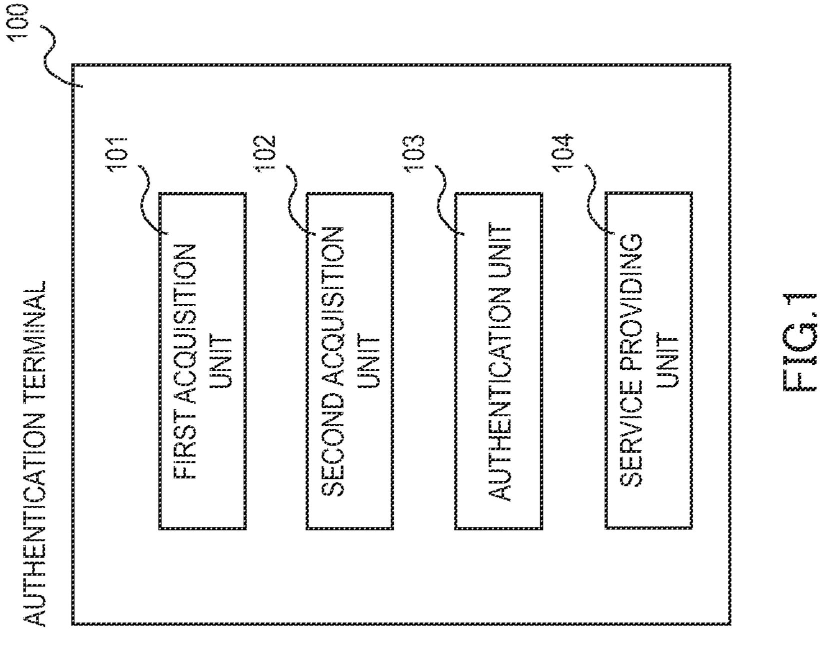
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

An authentication terminal 100 according to an example embodiment includes a first acquisition unit 101, a second acquisition unit 102, an authentication unit 103, and a service providing unit 104 (see FIG. 1). The first acquisition unit 101 acquires first biometric information of a user and determining data to determine whether or not to provide a service to the user from another apparatus when a distance between own terminal and the user reaches a first distance. The second acquisition unit 102 acquires second biometric information of the user when the distance between own terminal and the user reaches a second distance. The authentication unit 103 authenticates the user based on a first verification using the first biometric information and the second biometric information and a second verification using the determining data. The service providing unit 104 provides the service to a person who has been successfully authenticated when a result of an authentication is successful. When the result of the authentication is a failure, the service providing unit 104 determines an action to be taken for a person who has failed in the authentication according to which of the first verification or the second verification has failed.

For example, the authentication terminal 100 acquires biometric information of a user and determining data to determine whether or not to provide a service to the user from a terminal possessed by the user. The authentication terminal 100 performs an authentication of the user by performing a first verification using the biometric information and a second verification using the determining data. When the authentication has failed, the authentication terminal 100 changes an action (operation) according to whether the authentication has failed in either the first verification or the second verification. For example, when the first verification has failed, the authentication terminal 20 notifies a security guard or the like of that fact because an unauthorized use by a third party other than an owner of the terminal is suspected. When the second verification has failed, the authentication terminal 20 determines that the user has not met information to receive a service (for example, passing through a gate), and the authentication terminal 20 provides guidance regarding an action, and so on, that the user needs to take to receive the service. In this way, when the authentication terminal 100 has failed in authentication, the authentication terminal 100 provides information to the user according to the contents, so that the user can know what action he or she should take to receive the service. In other words, convenience for the user is improved.

Hereinafter, specific example embodiments will be described in more detail with reference to drawings.

First Example Embodiment

A first example embodiment will be described in more detail with reference to drawings.

[System Configuration]

FIG. 2 is a diagram illustrating an example of a schematic configuration of an authentication system (information processing system) according to the first example embodiment. As shown in FIG. 2, the authentication system includes a terminal 10 and an authentication terminal 20.

A user possesses a terminal 10. The terminal 10 is, for example, a mobile terminal such as a smartphone, tablet, and so on.

An authentication terminal 20 is a terminal that provides a predetermined service to a user who has been successfully authenticated. For example, the authentication terminal 20 is installed at an entrance and exit of an event venue or at various locations in an airport and permits a user who has been successfully authenticated to pass through.

In the first example embodiment, a gate apparatus installed at an airport will be described as an example of the authentication terminal 20. More specifically, the authentication terminal 20 permits a user who possesses a negative certificate regarding an infectious disease to pass, and rejects a user who does not possess that certificate to pass. However, it is not intended to limit the authentication terminal 20 to the gate apparatus installed at the airport. For example, the authentication terminal 20 may be a ticket issuing machine that issues a ticket.

The terminal 10 and each of the authentication terminals 20 are configured to be able to communicate with each other by means of short-range wireless communication such as Bluetooth (registered trademark).

The configuration of the authentication system shown in FIG. 2 is an example and is not intended to limit the configuration. For example, the authentication system may include at least one or more of the authentication terminals 20. In addition, although FIG. 2 shows one user (one terminal 10), it is of course not intended to limit the number of users or the number of terminals 10.

Outline of Operation

Next, operations in the authentication system according to the first example embodiment will be described.

<Preparation of Data for Determining Whether or not to Provide Service>

Before a user is authenticated by the authentication terminal 20, the user prepares information (data) required to pass through the authentication terminal 20. More specifically, the authentication terminal 20 is a gate apparatus installed at an airport, and the user is required to present a valid negative certificate, so the user prepares the valid negative certificate. In other words, the user prepares information (data) required to receive a service from the authentication terminal 20.

Note that the data required to pass through the above authentication terminal 20 (data required to receive a service from the authentication terminal 20) is described as "data for determining whether or not to provide service". Alternatively, the data for determining whether or not to provide a service may be simply denoted as "determining data". The authentication terminal 20 uses the data for determining whether or not to provide a service for an authentication of a user. In other words, based on the data for determining whether or not to provide service, it is checked that the user (authenticated person) has an authority, and so on, to pass through a gate.

The user manages the determining data by means of a so-called digital wallet. The user installs an application to realize the digital wallet on the terminal 10 that he or she possesses. By creating the digital wallet on the terminal 10, the user stores electronic money, credit card information, identification documents such as passports and driver's licenses, and various certificates such as a vaccination certificate and negative certificate (common pass) on the terminal 10.

Figure 3:
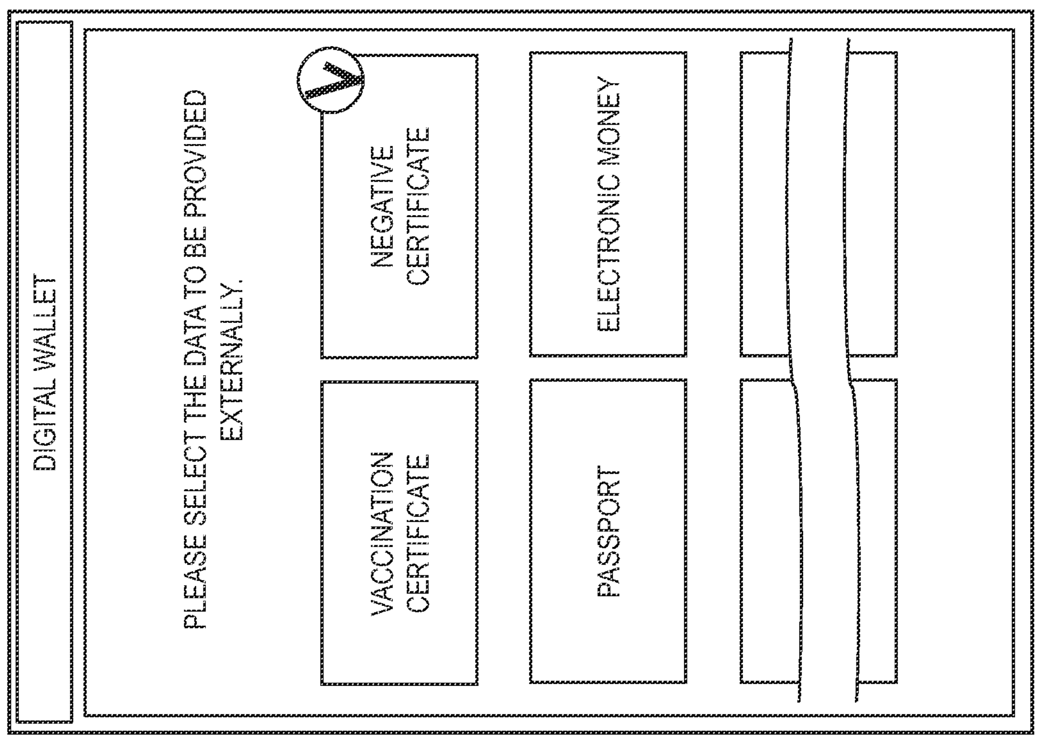
FIG. 3 is a diagram illustrating a digital wallet for a terminal according to the first example embodiment.

For example, the terminal 10 of the user stores digital information as shown in FIG. 3. In the following description, the information (data) stored by the digital wallet of the terminal 10 is described as "electronic wallet data". The electronic wallet data represents digital data that corresponds to a card and the like stored in a regular wallet. That is, the electronic wallet data represents digital data regarding a qualification, property, status, condition, attributes, and so on, of a user.

For example, examples of the electronic wallet data include electronic money as a means of payment, account information for crypto-assets, credit card information, official identification documents such as driver's licenses, and health-related certificates such as a vaccination certificate or negative certificate. Alternatively, examples of the electronic wallet data include digital data such as a medical examination card from a hospital, and so on, a membership card from a retail store, and so on, a point card, a coupon, an employee ID card, a student ID card, and so on.

The user selects determining data to be presented to the authentication terminal 20 from among the electronic wallet data managed by the digital wallet of the terminal 10. For example, in the example in FIG. 3, a negative certificate is selected as the "data for determining whether or not to provide service".

In addition to the electronic wallet data, the terminal 10 stores a user ID and biometric information of a user. For example, the user operates the terminal 10 to photograph his or her own face. The terminal 10 stores the face image or a feature value generated from the face image as the biometric information of the user.

For example, the biometric information about a user is data (feature values) calculated from physical features unique to this individual user. The physical features are about the face, a fingerprint, a voiceprint, a vein, a retina, or an iris pattern of an eye of the user. Alternatively, the biometric information may be image data such as a face image, fingerprint image. The biometric information of the user may be any information including physical features of the user. The present application describes a case in which biometric information (a face image or a feature value generated from the face image) regarding a "face" of a person is used.

<Authentication Operation>

Figures 4A, 4B:
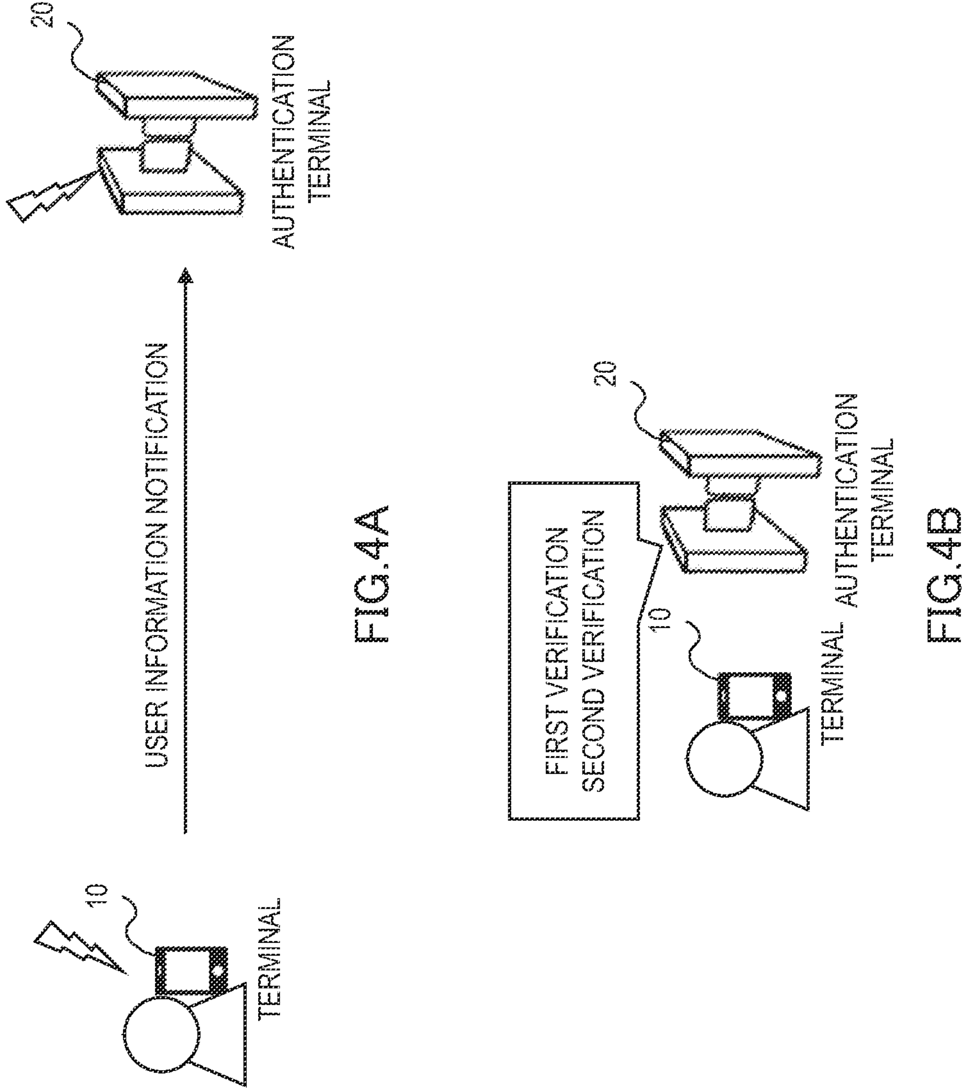
FIGS. 4A and 4B are diagrams illustrating an operation of the authentication system according to the first example embodiment.

A user approaches the authentication terminal 20 with the terminal 10 in his or her possession (see FIG. 4A). When a distance between the terminal 10 and the authentication terminal 20 reaches a predetermined distance (a distance that can be communicated by short-range wireless communication; for example, a distance of several meters), the terminal 10 transmits a "user information notification" to the authentication terminal 20.

Specifically, the terminal 10 transmits the user information notification that includes biometric information of the user and determining data of the user to the authentication terminal 20. The authentication terminal 20 stores the biometric information and the determining data included in the notification in a database of person to be matched. Note that details of the database of person to be matched will be described later.

After that, the user in possession of the terminal 10 arrives at the authentication terminal 20 (see FIG. 4B). When the user arrives at the authentication terminal 20, the authentication terminal 20 authenticates the user. An authentication processing of the authentication terminal 20 consists of two verifications.

A first verification is a verification using biometric information. The authentication terminal 20 determines whether or not an owner of the terminal 10 is legitimate by the first verification.

When a user arrives at the authentication terminal 20, the authentication terminal 20 acquires biometric information of the user. For example, the authentication terminal 20 acquires a face image by photographing the user.

The authentication terminal 20 performs a matching processing (1-to-N matching; N is a positive integer, and the same applies to the following description) using the biometric information acquired from the terminal 10 (biometric information included in the user information) and the biometric information acquired by photographing. If the matching processing (biometric authentication) is successful, the authentication terminal 20 determines that the first verification has been successful. That is, the authentication terminal 20 determines that the user who possesses the terminal 10 is legitimate.

If the matching processing (biometric authentication) fails, the authentication terminal 20 determines that the first verification has failed. That is, the authentication terminal 20 determines that the user who possesses the terminal 10 is illegitimate.

If biometric information (face image, feature value) that the user has registered in advance in the terminal 10 and the biometric information acquired from the user who has appeared in front of own terminal substantially match, the authentication terminal 20 can determine that a legitimate possessor or owner of the terminal 10 has appeared in front of the authentication terminal 20.

A second verification is a verification using data for determining whether or not to provide service. The authentication terminal 20 determines whether or not the authentication terminal 20 can provide the service to a user through the second verification. In other words, the authentication terminal 20 determines whether the user is qualified, authorized, and so on, to receive the service through the second verification.

The authentication terminal 20 determines whether determining data included in a user information notification is valid or not. Specifically, if a user has a valid negative certificate (a negative certificate whose validity period has not expired; for example, the negative certificate describing that 72 hours have not passed since a specimen was collected), the authentication terminal 20 determines that the second verification of the user has been successful.

When the negative certificate has expired or the terminal 10 does not store the negative certificate, the authentication terminal 20 determines that the second verification of the user has failed.

The authentication terminal 20 determines that an authentication of an authenticated person is successful when two verifications have been successful. Specifically, the authentication terminal 20 permits a user (authenticated person) to pass through a gate.

When at least one of the two verifications has failed, the authentication terminal 20 changes an action (processing, operation) of the authentication terminal 20 in accordance with the verification method that has failed.

When a first verification (biometric authentication) has failed, the authentication terminal 20 determines that the authenticated person may have illegally acquired and used the terminal 10 of another person. In this case, the authentication terminal 20 notifies a staff member, a security guard, or the like, that an event has occurred in which unauthorized use of the terminal 10 is suspected. For example, the authentication terminal 20 notifies a terminal possessed by the security guard of the possibility of the above-mentioned unauthorized use. Alternatively, the authentication terminal 20 displays the above possibility of the unauthorized use on a monitor installed in a waiting room or the like where the security guard or the like are waiting.

When a second verification (verification using data for determining whether or not to provide service) has failed, the authentication terminal 20 notifies a user that information required for an authentication (information required to pass through a gate) is not acquired. Alternatively, the authentication terminal 20 may provide the user with information for determining that the authentication will be successful. For example, the authentication terminal 20 may provide the user with guidance regarding a PCR (Polymerase Chain Reaction) test for acquiring a negative certificate.

Next, details of the individual apparatuses included in the authentication system according to the first example embodiment will be described.

[Terminal]

Examples of the terminal 10 include a portable terminal device such as a smartphone, a portable phone, and a tablet. The terminal 10 can be any equipment or device that accepts an operation by a user and can communicate with the authentication terminal 20.

Figure 5:
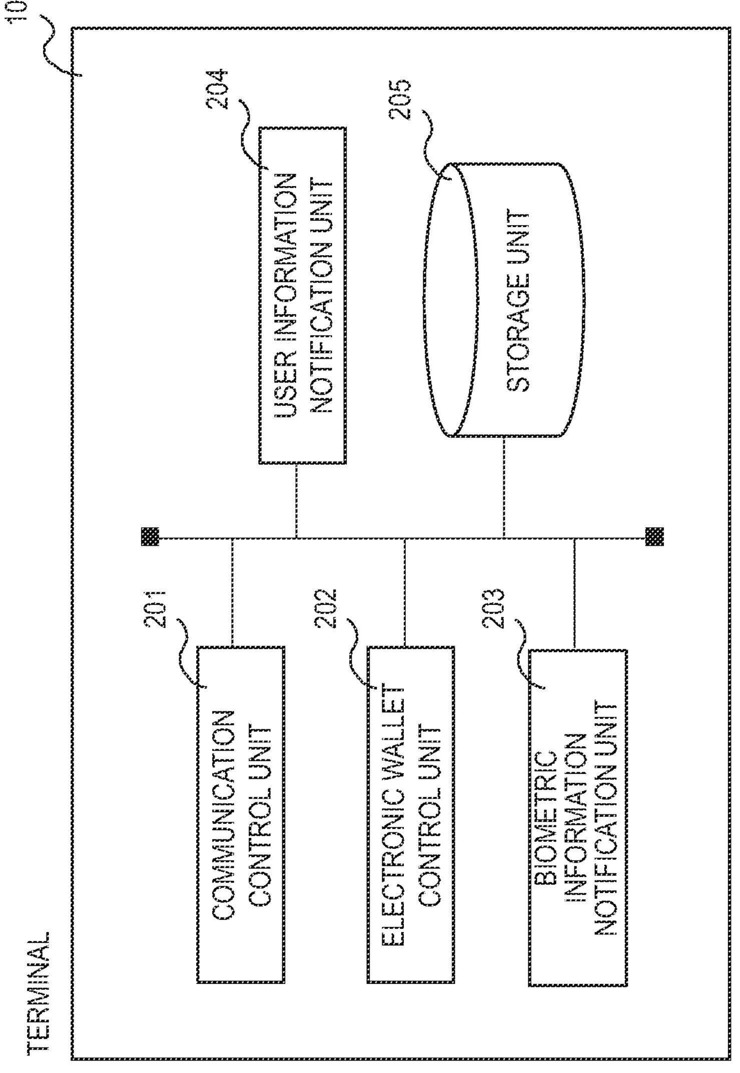
FIG. 5 is a diagram illustrating an example of a processing configuration of the terminal according to the first example embodiment.

FIG. 5 is a diagram illustrating an example of a processing configuration (processing modules) of the terminal 10 according to the first example embodiment. As illustrated in FIG. 5, the terminal 10 includes a communication control unit 201, an electronic wallet control unit 202, a biometric information acquisition unit 203, a user information notification unit 204, and a storage unit 205.

The communication control unit 201 is means for controlling communication with other apparatuses. For example, the communication control unit 201 receives data (packets) from the authentication terminal 20. In addition, the communication control unit 201 transmits data to the authentication terminal 20. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit 201. The communication control unit 201 includes a function as a receiving unit that receives data from other apparatuses and a function as a transmitting unit that transmits data toward other apparatuses.

The communication control unit 201 is compatible with short-range wireless communication such as Bluetooth (registered trademark) and communicates with the authentication terminal 20 by means of the short-range wireless communication. When the communication control unit 201 completes a connection with the authentication terminal 20, the communication control unit 201 notifies the user information notification unit 204 to that effect. Note that it is assumed that a pairing process required when terminal 10 and the authentication terminal 20 communicate via Bluetooth (registered trademark) has been completed in advance.

The electronic wallet control unit 202 is means for managing, controlling, and so on regarding a digital wallet. The electronic wallet control unit 202 acquires various types of electronic wallet data in response to an operation by a user and stores the various types of electronic wallet data in the storage unit 205.

Note that the electronic wallet control unit 202 is realized by an application installed in the terminal 10. Detailed descriptions regarding an installation related to an application to realize the digital wallet and a registration of specific electronic wallet data will be omitted. This is because these operations and the like are different from the purpose of the present application.

For example, regarding the registration of electronic wallet data, a user may operate terminal 10 to access a home page provided by an issuer of various types of information, and register the electronic wallet data in the digital wallet from the home page.

For example, regarding a vaccination certificate or a negative certificate, the electronic wallet control unit 202 accesses a home page or the like managed by a certificate issuing entity, such as a local government or a medical institution. The electronic wallet control unit 202 acquires the vaccination certificate and the negative certificate by inputting an ID, and so on, of a user into the home page in response to an operation by the user, and stores the vaccination certificate and the negative certificate in the storage unit 205. Alternatively, the electronic wallet control unit 202 may acquire the vaccination certificate, and so on, by photographing a two-dimensional code described on the vaccination certificate, and so on, in response to an operation by the user. In this way, the electronic wallet control unit 202 may acquire the vaccination certificate, and so on, by accessing the local government or the medical institution, or the user may register the vaccination certificate, and so on, in the digital wallet by himself or herself.

Alternatively, with respect to an identification document such as a passport or driver's license, the electronic wallet control unit 202 may capture an image of these documents in response to an operation by a user and store the image data as electronic wallet data related to the passport, driver's license, and so on.

The electronic wallet control unit 202 also generates a user ID to identify the user who owns a digital wallet. The user ID may be any information as long as it can uniquely identify the user. For example, the electronic wallet control unit 202 may acquire an email address from the user and treat the email address as the user ID. The electronic wallet control unit 202 stores the user ID in the storage unit 205.

Furthermore, the electronic wallet control unit 202 displays a GUI, and so on, for selecting information to be provided to the authentication terminal 20 in response to a predetermined action by the user (for example, pressing a menu for registering data for determining whether or not to provide service). For example, the electronic wallet control unit 202 displays the GUI shown in FIG. 3 and acquires determining data to be provided to the authentication terminal 20.

In the example in FIG. 3, since a negative certificate is selected, the electronic wallet control unit 202 stores the "negative certificate" as "data for determining whether or not to provide service" in the storage unit 205.

Figure 6:
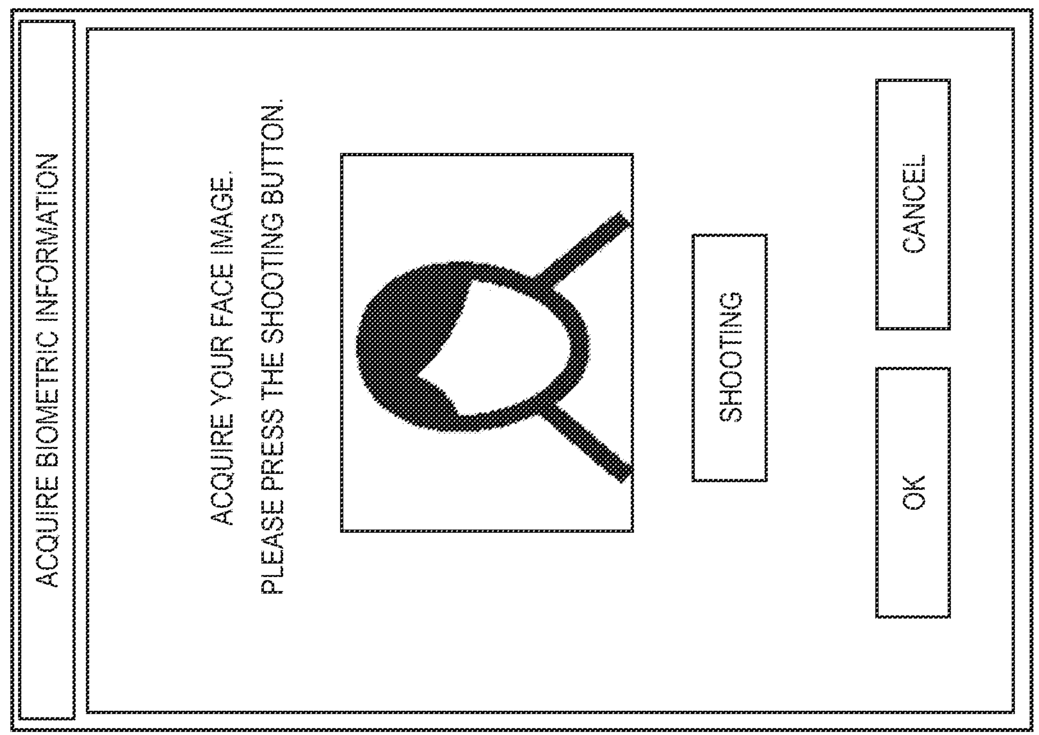
FIG. 6 is a diagram illustrating an example of a display of the terminal according to the first example embodiment.

The biometric information acquisition unit 203 is means for acquiring biometric information of a user. For example, the biometric information acquisition unit 203 acquires biometric information (a face image) using a GUI (Graphical User Interface) as shown in FIG. 6. The biometric information acquisition unit 203 generates a feature value from the acquired face image and stores the generated feature value in the storage unit 205.

An existing technique can be used to generation process of the feature value, and therefore, detailed description thereof will be omitted. For example, the biometric information acquisition unit 203 extracts the eyes, nose, mouth, etc. as feature points from the face image. Next, the biometric information acquisition unit 203 calculates, as feature values, the location of the individual feature point and the distance between feature points and generates a feature vector formed by a plurality of feature values (vector information that features the face image).

The user information notification unit 204 is means for notifying the authentication terminal 20 of user information. When the terminal 10 starts communication with the authentication terminal 20, the user information notification unit 204 reads out biometric information (a feature value generated from a face image) and determining data stored in the storage unit 205. The user information notification unit 204 transmits a "user information notification" that includes the read out biometric information and determining data to the authentication terminal 20. That is, the user information notification unit 204 transmits determining data of various types of certificates, such as electronic money, credit card information, an identification document such as a passport or driver's license, a vaccination certificate or a negative certificate (common pass), or the like, and biometric information of the user to the authentication terminal 20.

In this way, when the user information notification unit 204 starts communication with the authentication terminal 20 by a short-range wireless communication means, the user information notification unit 204 transmits biometric information (first biometric information; for example, a feature value) and data for determining whether or not to provide service to the authentication terminal 20.

The storage unit 205 is means for storing information necessary for the operation of the terminal 10.

[Authentication Terminal]

Figure 7:
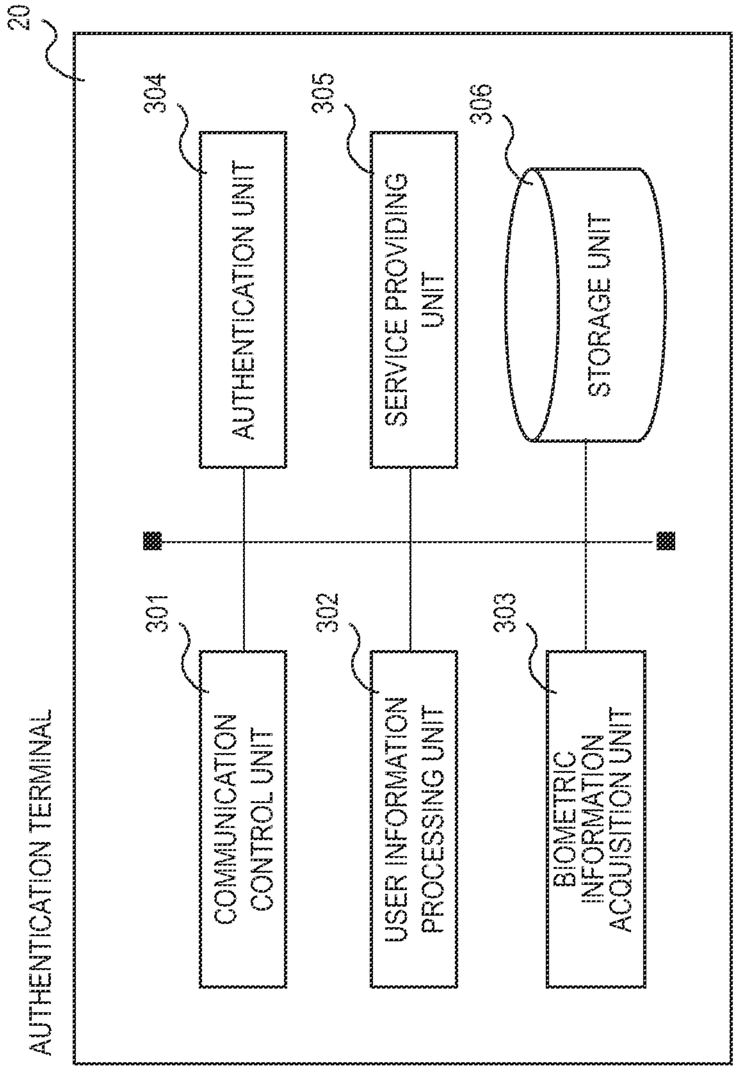
FIG. 7 is a diagram illustrating an example of a processing configuration of an authentication terminal according to the first example embodiment.

FIG. 7 is a diagram illustrating an example of a processing configuration (processing modules) of the authentication terminal 20 according to the first example embodiment. As illustrated in FIG. 7, the authentication terminal 20 includes a communication control unit 301, a user information processing unit 302, a biometric information acquisition unit 303, an authentication unit 304, a service providing unit 305, and a storage unit 306.

The communication control unit 301 is means for controlling communication with other apparatuses. For example, the communication control unit 301 receives data (packets) from the terminal 10. In addition, the communication control unit 301 transmits data to the terminal 10. The communication control unit 301 gives data received from other apparatuses to other processing modules. The communication control unit 301 transmits data acquired from other processing modules to other apparatuses. In this way, other processing modules transmit and receive data to and from other apparatuses via the communication control unit 301. The communication control unit 301 includes a function as a receiving unit that receives data from other apparatuses and a function as a transmitting unit that transmits data to other apparatuses.

The communication control unit 301 is compatible with short-range wireless communication such as Bluetooth (registered trademark) and communicates with the terminal 10 through the short-range wireless communication.

The user information processing unit 302 is means (first acquisition unit) for acquiring biometric information (first biometric information) and determining data of a user from another device when a distance between own terminal and the user reaches a first distance (for example, communication distance of Bluetooth (registered trademark)). Note that, as described above, the determining data (data for determining whether or not to provide service) is data for determining whether or not to provide a service to a user.

More specifically, the user information processing unit 302 performs a processing related to a user information notification received from the terminal 10. When the user information processing unit 302 acquires the user information notification, the user information processing unit 302 registers biometric information (a feature value) and determining data included in the user information notification in a database of person to be matched (see FIG. 8).

As shown in FIG. 8, the database of person to be matched includes a biometric information field and a field for determining whether or not to provide service. Note that the database of person to be matched shown in FIG. 8 is an example and is not intended to limit the items to be stored. For example, a registration date and time for an entry may be stored in the database of person to be matched.

The biometric information acquisition unit 303 is means for controlling a camera device (camera device included in the authentication terminal 20) and acquiring biometric information (for example, face image) of a user who has arrived at the authentication terminal 20 (a user who has arrived at a predetermined area in front of the authentication terminal 20). The biometric information acquisition unit 303 is a second acquisition unit that acquires biometric information (second biometric information) of a user when a distance between own terminal and the user becomes a second distance (a shorter distance than the first distance; a distance between the user who has arrived at the authentication terminal 20 and the authentication terminal 20).

The biometric information acquisition unit 303 takes images of the front of own terminal periodically or at predetermined times. The biometric information acquisition unit 303 determines whether the acquired image includes a human face image, and if the human face image is included, extracts the face image from the acquired image data.

An existing technique can be used for the face image detection and extraction processing performed by the biometric information acquisition unit 303, and therefore, detailed description thereof will be omitted. For example, the biometric information acquisition unit 303 may extract a face image (a face area) from the image data by using a learning model learned by a CNN (Convolutional Neural Network). Alternatively, the biometric information acquisition unit 303 may extract a face image by using a technique such as template matching.

The biometric information acquisition unit 303 generates a feature value from the extracted face image. The biometric information acquisition unit 303 gives the generated feature value (biometric information) to the authentication unit 304.

The authentication unit 304 is means for authenticating a user who has arrived at own terminal (authentication terminal 20). As described above, the authentication unit 304 authenticates the user using two verifications. The authentication unit 304 authenticates the user based on a result of a first verification using first biometric information acquired from the terminal 10 and second biometric information acquired by photographing the user, and a result of a second verification using determining data.

When the authentication unit 304 acquires biometric information from the biometric information acquisition unit 303, the authentication unit 304 performs the first verification using the biometric information. The authentication unit 304 performs a matching processing using the biometric information acquired from the biometric information acquisition unit 303 and biometric information stored in the database of person to be matched as a first verification.

The authentication unit 304 calculates a similarity between a feature value of the user who has arrived at own terminal and feature values registered in the database of person to be matched. For the individual similarity, the chi-squared distance, the Euclidean distance, or the like may be used. A longer distance represents a lower similarity, and a shorter distance represents a higher similarity.

If there is a similarity that is equal to or greater than a predetermined value, the authentication unit 304 determines that the matching processing has been successful. When the matching processing has been successful, the authentication unit 304 determines that the first verification (verification using biometric information) regarding an authenticated person has been successful.

If there is no similarity that is equal to or greater than the predetermined value, the authentication unit 304 determines that the matching processing has been unsuccessful. When the matching processing has failed, the authentication unit 304 determines that the first verification (verification using biometric information) regarding the authenticated person has been unsuccessful.

Note that the matching process by the authentication unit 304 (matching processing using the first and second biometric information) verifies (checks) a legitimacy of the user who has arrived at the authentication terminal 20. For example, if a third party other than an owner of the terminal 10 arrives at the authentication terminal 20 with the terminal 10, biometric information stored in the terminal 10 and biometric information acquired by the authentication terminal 20 do not match, and thus the matching processing fails.

When the first verification is successful, the authentication unit 304 reads out data for determining whether or not to provide service of an entry with the highest similarity (an entry in the database of person to be matched) from the database of person to be matched.

The authentication unit 304 performs the second verification using the read out determining data. More specifically, the authentication unit 304 determines a validity of the determining data as the second verification. The authentication unit 304 determines that the second verification has been successful if the determining data is valid. The authentication unit 304 determines that the second verification has failed if the determining data is invalid.

Note that a method of determining the validity of the determining data differs depending on a function, and so on, assigned to the authentication terminal 20. For example, the authentication unit 304 checks a validity period of a negative certificate acquired from the terminal 10, and determines that "the determining data is valid" if the period has not elapsed, and "the determining data is invalid" if the period has elapsed.

Alternatively, the authentication unit 304 may determine the validity of the determining data based on whether or not a method of test, and so on, described in the acquired negative certificate matches a method of test that is predetermined for the authentication terminal 20.

The authentication unit 304 sets a result of the authentication based on results of the two verifications. If the authentication unit 304 succeeds in the two verifications, the authentication unit 304 sets "authentication success" as the result of the authentication of the authenticated person. If the authentication unit 304 fails at least one of the two verifications, the authentication unit 304 sets "authentication failure" as the result of the authentication of the authenticated person. The authentication unit 304 notifies the service providing unit 305 of the determined result of the authentication. When the authentication unit 304 notifies the authentication failure, the authentication unit 304 notifies the service providing unit 305 of a cause of the authentication failure (method of verification) as accompanying information accompanied with the result of the authentication. Specifically, the authentication unit 304 notifies "first verification failure" or "second verification failure" along with the authentication failure.

The service providing unit 305 is means for providing a service assigned to the authentication terminal 20. The service providing unit 305 performs a task (operation, processing) assigned to the authentication terminal 20. In the first example embodiment, the service providing unit 305 permits a user who has successfully authenticated to pass through a gate. The service providing unit 305 rejects a user who has failed in authentication to pass through the gate.

When the result of the authentication by the authentication unit 304 is successful, the service providing unit 305 provides a service to the person who has been successfully authenticated (the authenticated person who has been determined to be successfully authenticated). When the result of the authentication by the authentication unit 304 is a failure, the service providing unit 305 determines an action to be taken for the person who has failed in authentication (the authenticated person who has been determined to have failed in authentication) according to which of the first verification or the second verification has failed.

The service providing unit 305 outputs a message according to the result of the authentication and its accompanying information (failed method of verification).

Figures 9A, 9B:
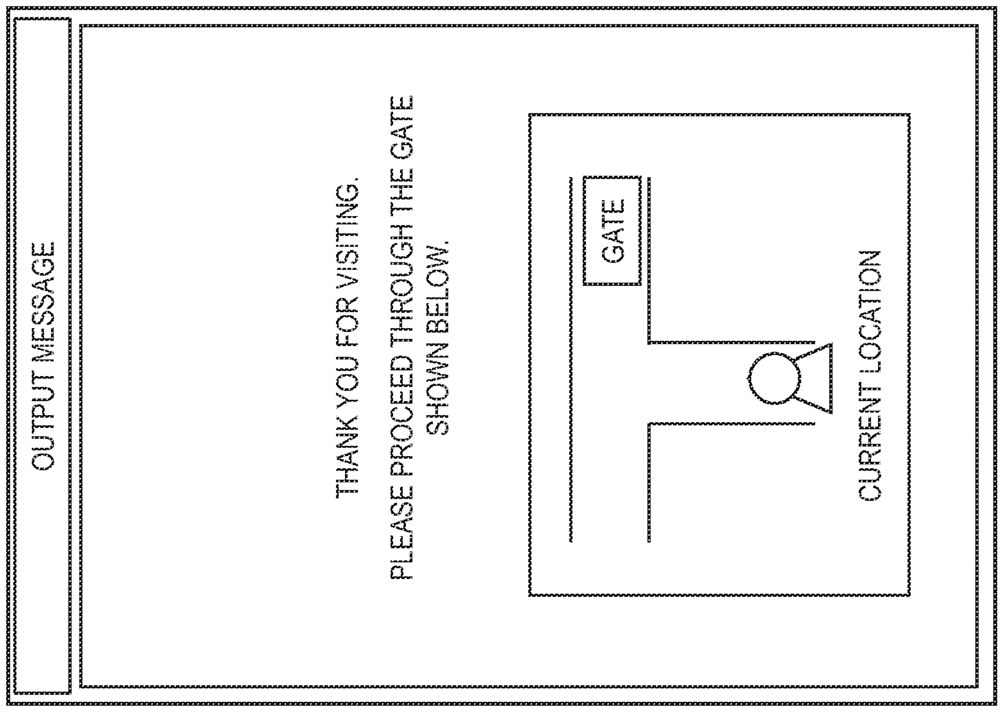
FIGS. 9A and 9B are diagrams illustrating an example of a display of the authentication terminal according to the first example embodiment.

For example, when the authentication is successful, the service providing unit 305 displays a message as shown in FIG. 9A. Alternatively, when the authentication terminal 20 is a kiosk terminal, the service providing unit 305 displays a message that clearly indicates a location of a gate that can be passed (see FIG. 9B).

Figure 10:
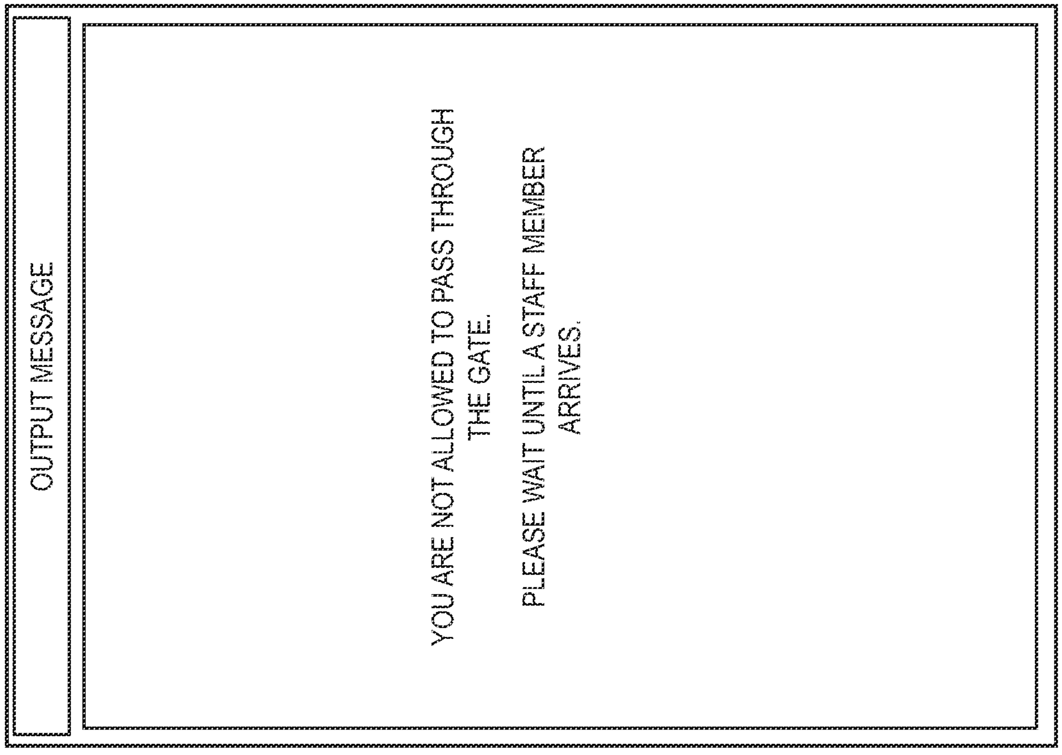
FIG. 10 is a diagram illustrating an example of a display of the authentication terminal according to the first example embodiment.

When the authentication fails and its factor is the first verification (verification using biometric information), for example, the service providing unit 305 displays a message as shown in FIG. 10. Since the fact that the first verification has failed means that unauthorized use of the terminal 10 is suspected, the service providing unit 305 instructs the authenticated person to remain where he or she is.

In addition, the service providing unit 305 notifies a staff member, security guard, or the like, that an event has occurred in which the unauthorized use of the terminal 10 is suspected. For example, the service providing unit 305 notifies a terminal possessed by the security guard of a possibility of the above-mentioned unauthorized use.

Here, when the authentication fails in response to the failure of the first verification using biometric authentication, the service providing unit 305 may reacquire the biometric information of the user or may attempt to perform matching processing using other biometric information. When other biometric information (for example, iris information, fingerprint, palm print) is used, these biometric information are stored in the terminal 10 in advance. By taking action in this way, it is possible to appropriately deal with a case where a clear face image can not be acquired due to an environment in which the authentication terminal 20 is installed, and so on.

Note that regardless of the result of the second verification (verification regarding a validity of data for determining whether or not to provide service), when the first verification (biometric authentication) fails, the service providing unit 305 provides a notification regarding the unauthorized use of the terminal 10.

In this way, the service providing unit 305 notifies a person who has been predetermined (staff member, security guard, or the like) of the unauthorized use of the terminal 10 by a person who has failed in authentication (possibility of unauthorized use), when the first verification is unsuccessful.

Figures 11A, 11B:
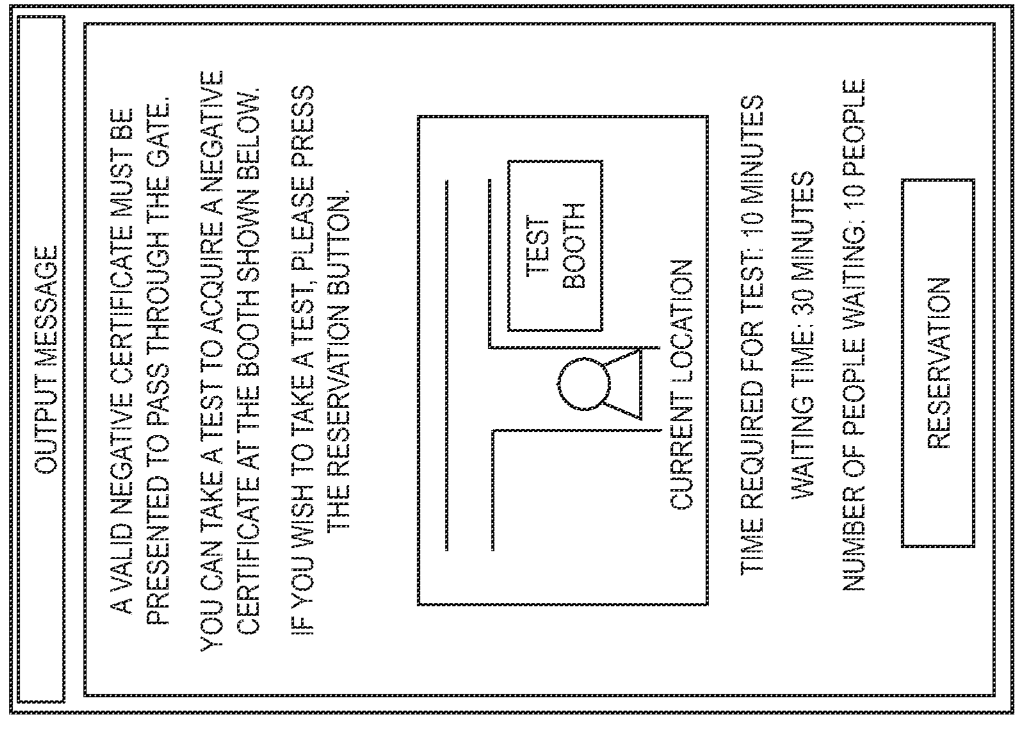
FIGS. 11A and 11B are diagrams illustrating an example of a display of the authentication terminal according to the first example embodiment.

When the authentication fails and its factor is the second verification (verification using determining data), for example, the service providing unit 305 displays a message as shown in FIG. 11A. By the message as shown in FIG. 11A, the service providing unit 305 notifies the user that information required for authentication (information required to pass through a gate) could not be acquired.

Furthermore, when the second verification has failed, unlike the failure of the first verification, there is no reason to suspect unauthorized use of the terminal 10 or the like, so the service providing unit 305 may provide information to the user to determine that the authentication will be successful. For example, as shown in FIG. 11B, the service providing unit 305 may provide the user with detailed guidance on a PCR (Polymerase Chain Reaction) test, and so on, to acquire a negative certificate. Further, the service providing unit 305 may also display a button, and so on, for reserving a PCR test or the like, as shown in FIG. 11B. In this case, the service providing unit 305 notifies a testing agency of information on a user who has reserved a test.

In this way, when the first verification is successful and the second verification is unsuccessful, the service providing unit 305 may provide guidance a person who has failed in authentication through a procedure necessary to receive a service.

The storage unit 306 is means for storing information necessary for the operation of the authentication terminal 20. The database of person to be matched is established in the storage unit 306.

Figure 12:
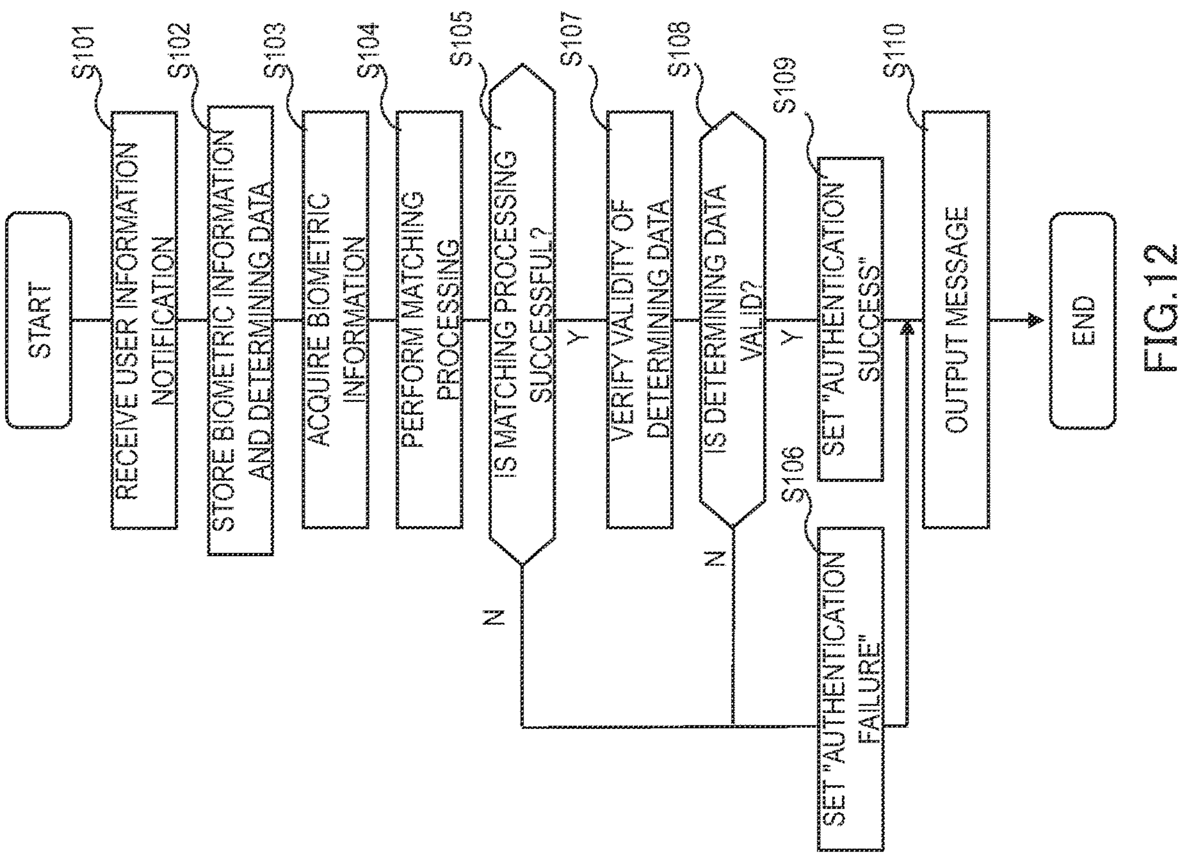
FIG. 12 is a flowchart illustrating an example of an operation of the authentication terminal according to the first example embodiment.

The operations of the authentication terminal 20 can be summarized as shown in a flowchart shown in FIG. 12. FIG.

12 is a flowchart illustrating an example of the operations of the authentication terminal 20 according to the first example embodiment.

The authentication terminal 20 receives a user information notification from the terminal 10 (step S101).

The authentication terminal 20 stores biometric information and data for determining whether or not to provide service (determining data) included in the user information notification in the database of person to be matched (step S102).

The authentication terminal 20 acquires biometric information of a user when the user arrives at own terminal (step S103).

The authentication terminal 20 performs a first verification using biometric information. Specifically, the authentication terminal 20 performs a matching processing using the acquired biometric information and the biometric information stored in the database of person to be matched (step S104).

If the matching processing fails (step S105, No branch), the authentication terminal 20 sets "authentication failure" as a result of the authentication of the user (step S106).

If the matching processing is successful (step S105, Yes branch), the authentication terminal 20 performs a second verification. Specifically, the authentication terminal 20 verifies a validity of the data for determining whether or not to provide service (step S107).

When the determining data is invalid (step S108, No branch), the authentication terminal 20 sets "authentication failure" as the result of the authentication of the user (step S106).

When the determining data is valid (step S108, Yes branch), the authentication terminal 20 sets "authentication success" as the result of the authentication of the user (step S109).

The authentication terminal 20 outputs a message in response to the result of the authentication (step S110). The authentication terminal 20 provides s a service to a person who has been successfully authenticated.

Variation 1 According to the First Example Embodiment

In the above example embodiment, it is assumed that Bluetooth (registered trademark) of the terminal 10 is turned on. However, it is possible that a function of the Bluetooth (registered trademark) of the terminal 10 may be turned off.

Figure 13:
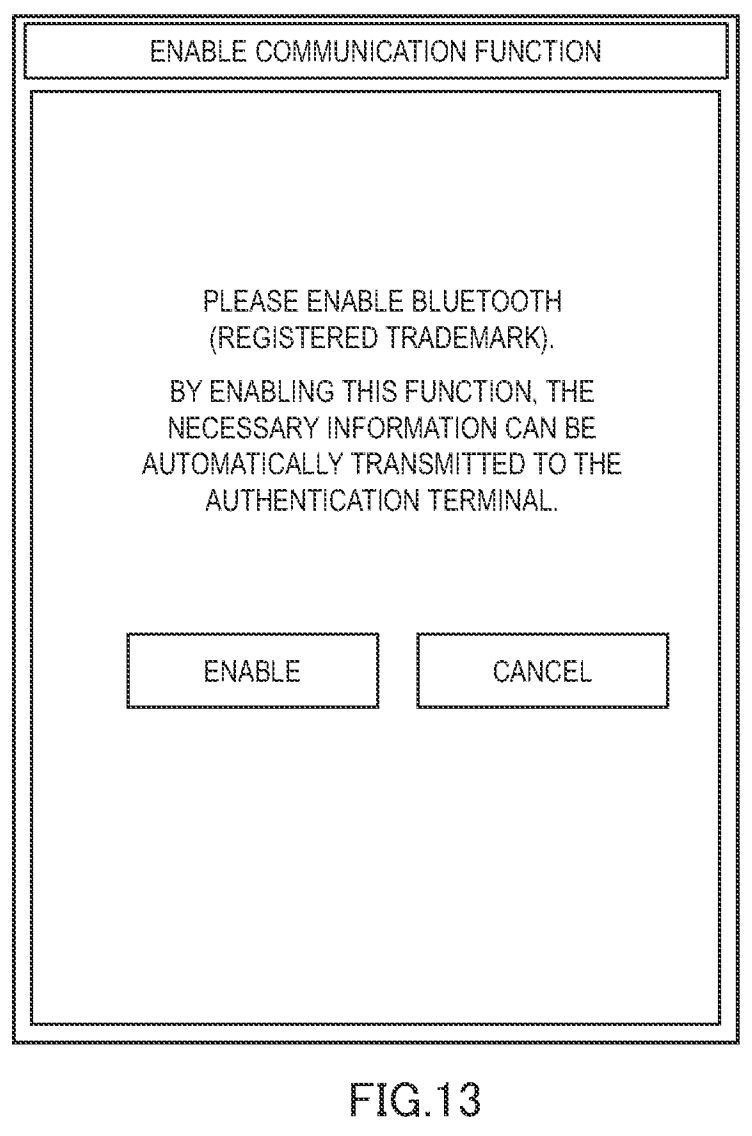

In this case, the terminal 10 may guide a user to turn on the function of the Bluetooth (registered trademark) triggered by when own terminal is approaching to the authentication terminal 20. For example, the user information registration unit 204 of the terminal 10 may display a GUI as shown in FIG. 13 to prompt the user to enable the function of the Bluetooth (registered trademark).

Note that the terminal 10 (the user information notification unit 204) acquires a location where the authentication terminal 20 is installed (location information; X coordinate, Y coordinate) from an external server on the internet. The user information notification unit 204 receives a GPS signal from a Global Positioning System (GPS) satellite, executes positioning, and generates location information that includes a latitude and longitude of own terminal. Alternatively, the user information notification unit 204 may communicate with a wireless access point and treat a location of the wireless access point as a location of own terminal. Alternatively, the user information notification unit 204 may generate location information based on strength of a radio wave received from the wireless access point.

The user information notification unit 204 determines whether or not own terminal is close to the authentication terminal 20 using the location information of the authentication terminal 20 acquired from the external server and the location information of the own terminal generated above. Specifically, the user information notification unit 204 determines that there is the authentication terminal 20 nearby if there is the authentication terminal 20 installed within a predetermined range around the center of the own terminal.

In this way, the terminal 10 may prompt a user to enable a short-range wireless communication means when a distance between the terminal 10 and the authentication terminal 20 reaches a third distance.

Note that the trigger for prompting the user to turn on Bluetooth (registered trademark) may be other than that the terminal 10 approaches the authentication terminal 20. For example, the user may be prompted to turn on the Bluetooth (registered trademark) based on a date and time. For example, when a user has reserved a flight ticket, the terminal 10 estimates a date and time when the user will arrive at a departure airport based on reservation information for the flight ticket. The terminal 10 may prompt the user to turn on Bluetooth (registered trademark) based on the estimated date and time. For example, the terminal 10 may prompt the user to turn on the Bluetooth (registered trademark) a few hours before a departure time. For example, when the user has reserved a flight departing at 14:00, the terminal 10 may prompt the user to turn on the Bluetooth (registered trademark) at 12:00.

Note that the use of location information and time information is not limited to enabling the function of short-range wireless communication means such as Bluetooth (registered trademark). For example, the terminal 10 may utilize the above location information and time information in confirming whether or not data stored in a digital wallet may be transmitted to the authentication terminal 20, or in prompting to follow a procedure for selecting data to be transmitted. For example, when a user (terminal 10) moves to a predetermined location or when a predetermined time is reached, the terminal 10 may display a GUI or the like to confirm with the user whether data in the digital wallet may be transmitted to the authentication terminal 10. Similarly, when a user moves to a predetermined location or when a predetermined time is reached, the terminal 10 may display a GUI to prompt the user to select data to be transmitted to the authentication terminal 20 among data stored in the digital wallet.

Variation 2 According to the First Example Embodiment

The above example embodiment describes communicating between the terminal 10 and the authentication terminal 20 using Bluetooth (registered trademark). However, a communication means for communication between the terminal 10 and the authentication terminal 20 is not a communication means with a relatively long communication distance, such as Bluetooth (registered trademark), but a communication means with a short communication distance, such as NFC (Near Field Communication). Note that when a communication means with a short communication distance, such as NFC, is used, the first distance and the second distance above are substantially the same.

In this case, the terminal 10 of the user and the authentication terminal 20 can communicate with each other after the user arrives at the authentication terminal 20. Specifically, when the user holds the terminal 10 over (touches) the authentication terminal 20 like a transportation system IC (Integrated Circuit) card, the terminal 10 and authentication terminal 20 can communicate with each other.

As described above, in the authentication system according to the first example embodiment, the authentication terminal 20 acquires biometric information of a user and determining data from the terminal 10 possessed by the user. The authentication terminal 20 performs a first verification using biometric information of the user and a second verification using the determining data, and performs an authentication processing regarding the user who has arrived at own terminal. When the authentication terminal 20 has failed in the authentication, the authentication terminal 20 changes an action (operation) according to whether the authentication terminal 20 has failed in either the first verification or the second verification. Specifically, if the first verification has failed, the authentication terminal 20 notifies a security guard or the like to that effect, because an unauthorized use by a third party other than an owner of the terminal 10 is suspected. When the second verification has failed, the authentication terminal 20 determines that the user has not met a condition to receive a service, and provides guidance regarding an action that the user needs to take to receive the service. In this way, when the authentication terminal 20 has failed in authentication, the authentication terminal 20 provides appropriate information to the user according to the contents, so that the user can know what action he or she should take to receive a service.

Furthermore, the authentication system according to the first example embodiment completes a series of authentication processing by transmitting and receiving data between the authentication terminal 20 and the terminal 10. That is, the authentication processing is performed without using a server that stores various types of certificates and so on. In this way, a more secure authentication system is provided by using information stored in the terminal 10 (information distributed to each terminal 10) to perform the authentication processing, without using a server. That is, when a server is used to store and manage a certificate, and so on, of each of a plurality of users, when an information leakage occurs from the server, the certificate, and so on, of the each of a plurality of users may be leaked, causing a great deal of damage. In addition, the authentication terminal 20 prevents an unauthorized use of the terminal 10 by performing a matching processing using biometric information of an owner of the terminal 10 and a user who possesses the terminal 10 and wishes to provide a service.

Second Example Embodiment

Next, a second example embodiment will be described in detail with reference to drawings.

In the first example embodiment, a case in which the terminal 10 transmits biometric information and data for determining whether or not to provide service to the authentication terminal 20 has been described. In the second example embodiment, a case in which biometric information and data for determining whether or not to provide service are transmitted from a server to an authentication terminal 20 will be described.

The following description will be made with a focus on the difference between the first example embodiment and the second example embodiment.

Figure 14:
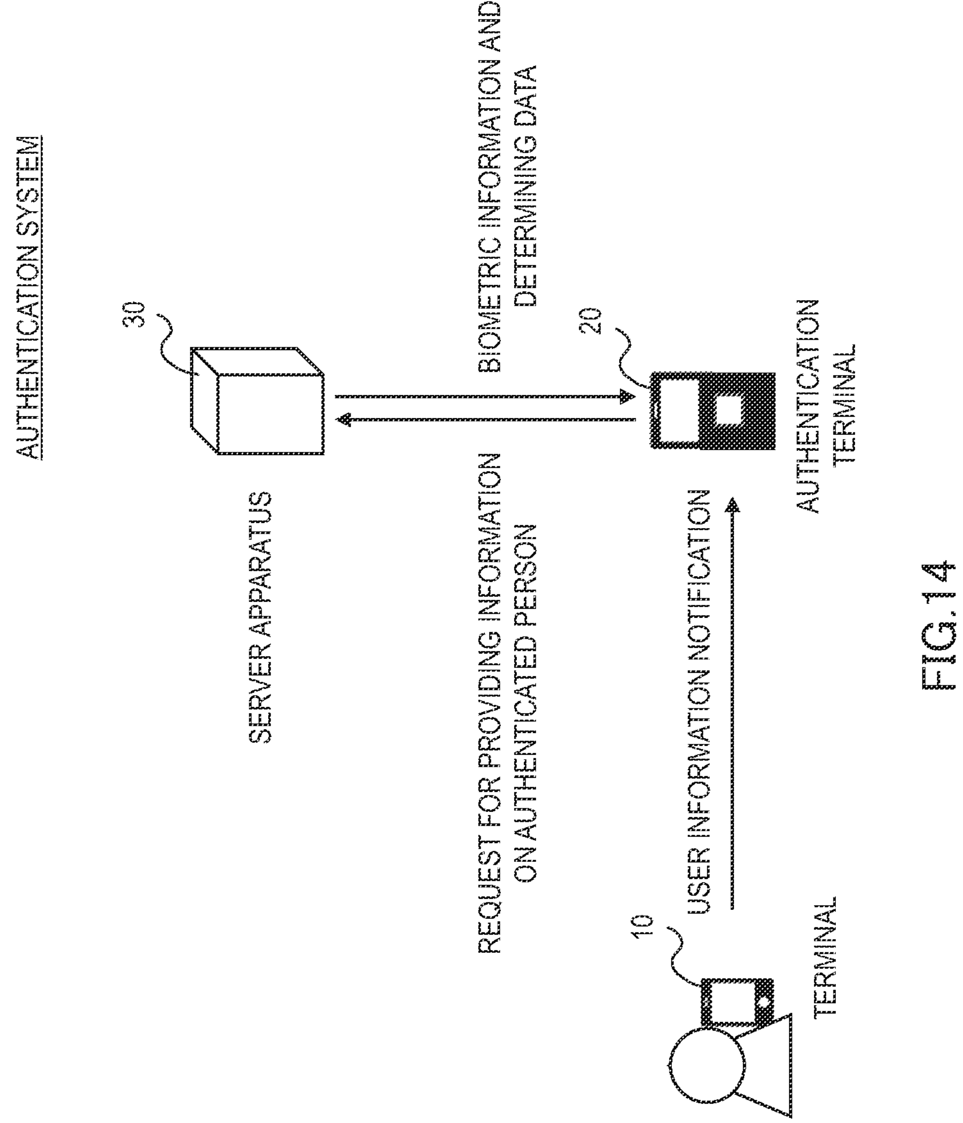
FIG. 14 is a diagram illustrating an example of a schematic configuration of an authentication system according to a second example embodiment.

FIG. 14 is a diagram illustrating an example of a schematic configuration of an authentication system according to a second example embodiment. As illustrated in FIG. 14, the authentication system includes a server apparatus 30 in addition to a terminal 10 and an authentication terminal 20.

The server apparatus 30 stores a user ID, biometric information of a user, and data for determining whether or not to provide service in association with each other.

The terminal 10 according to the second example embodiment stores electronic wallet data and a user ID. However, the terminal 10 does not store biometric information of a user. When a user in possession of the terminal 10 approaches the authentication terminal 20, the terminal 10 transmits a user information notification to the authentication terminal 20 that includes the user ID.

The authentication terminal 20 transmits a "request for providing information on authenticated person" that includes the user ID to the server apparatus 30.

The server apparatus 30 transmits biometric information and determining data corresponding to the user ID included in the request for providing information on authenticated person to the authentication terminal 20.

The authentication terminal 20 registers the biometric information and the determining data acquired from the server apparatus 30 in the database of person to be matched.

The subsequent operations of the terminal 10 and the authentication terminal 20 can be the same as those described in the first example embodiment.

Next, details of the individual apparatuses included in the authentication system according to the second example embodiment will be described.

[Terminal]

Figure 15:
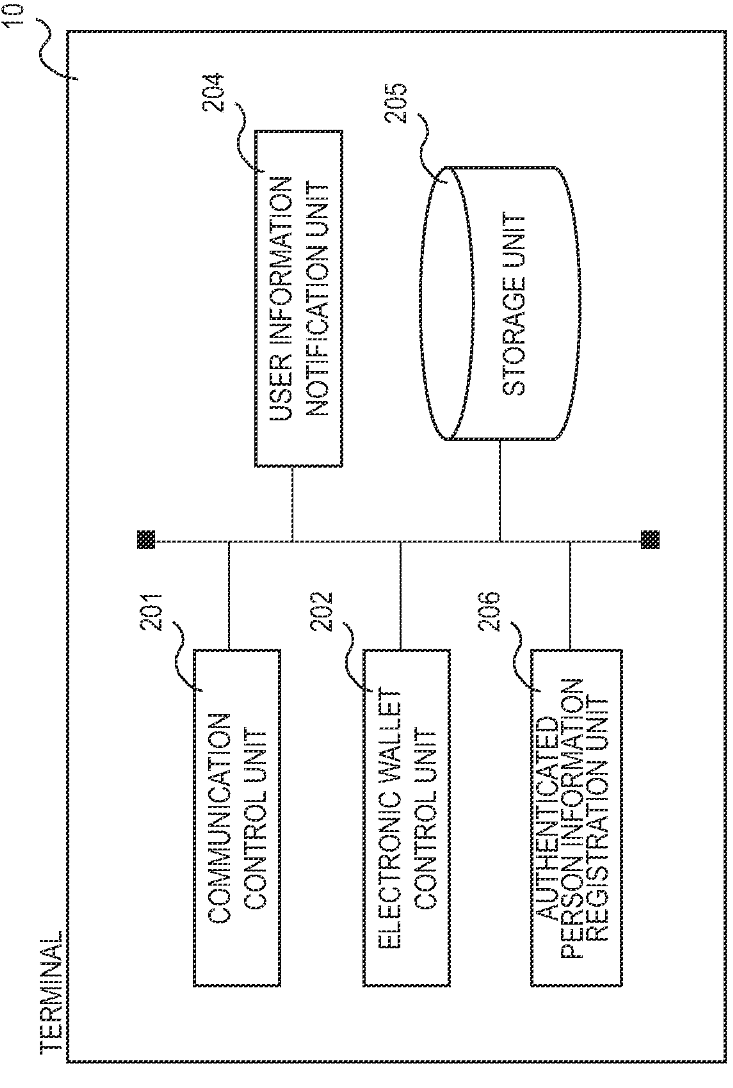
FIG. 15 is a diagram illustrating an example of a processing configuration of a terminal according to the second example embodiment.

FIG. 15 is a diagram illustrating an example of a processing configuration (processing modules) of the terminal 10 according to the second example embodiment. Referring to FIG. 15, in the configuration of the terminal 10 according to the first example embodiment, the biometric information acquisition unit 203 is deleted and an authenticated person information registration unit 206 is added.

The user information registration unit 206 is means for registering a user ID, biometric information and determining data of a user (authenticated person in future) in the server apparatus 30. The authenticated person information registration unit 206 accesses the server apparatus 30 in response to an operation by the user. The user information registration unit 206 inputs the user ID of the user, the biometric information (for example, a face image) of the user and the data for determining whether or not to provide service (for example, a negative certificate) of the user into the server apparatus 30.

The user information notification unit 204 according to the second example embodiment transmits a user information notification that includes the user ID to the authentication terminal 20.

[Authentication Terminal]

The processing configuration (processing modules) of the authentication terminal 20 for the second example embodiment can be the same as the processing configuration of the authentication terminal 20 according to the first example embodiment shown in FIG. 7.

When the user information processing unit 302 according to the second example embodiment receives a user information notification from the terminal 10, the user information processing unit 302 transmits a user ID included in the user information notification to the server apparatus 30. More specifically, the user information processing unit 302 transmits a request for providing information on authenticated person that includes the user ID to the server apparatus 30.

The user information processing unit 302 receives a response to the request for providing information on authenticated person. When the user information processing unit 302 has received a negative response, the user information processing unit 302 does not perform any special processing. When the user information processing unit 302 has received a positive response, the user information processing unit 302 stores the biometric information and the determining data included in the positive response in the database of person to be matched.

In this way, the user information processing unit 302 according to the second example embodiment acquires biometric information and determining data of a user from the server apparatus 30.

[Server Apparatus]

Figure 16:
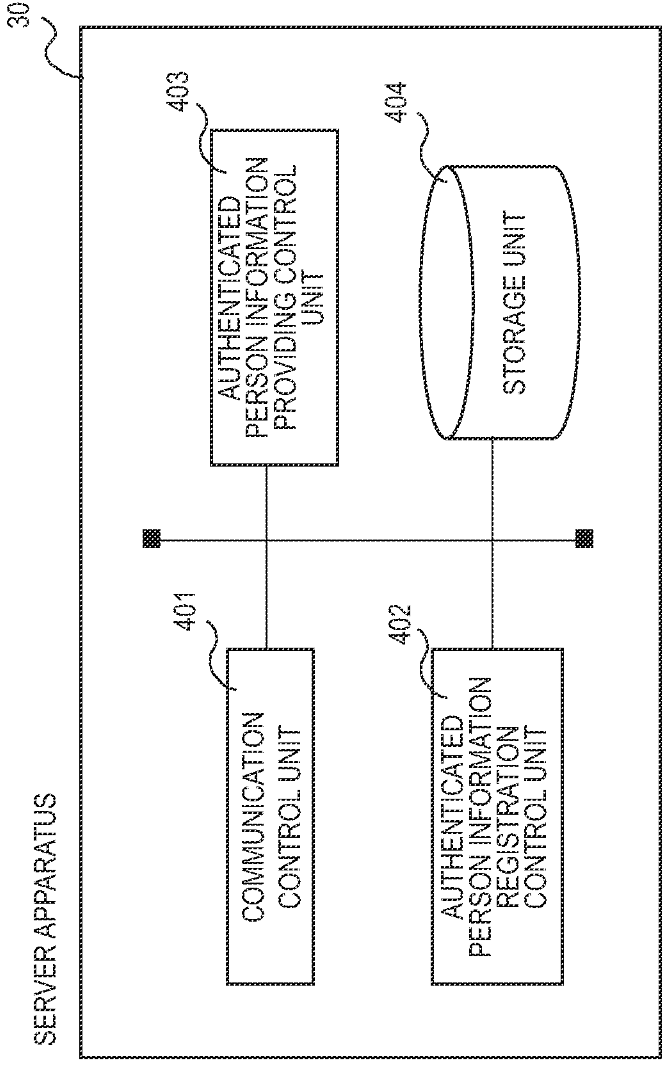
FIG. 16 is a diagram illustrating an example of a processing configuration of a server apparatus according to the second example embodiment.

FIG. 16 is a diagram for illustrating an example of a processing configuration (processing modules) of the server apparatus 30 according to the second example embodiment. As illustrated in FIG. 16, the server apparatus 30 includes a communication control unit 401, an authenticated person information registration control unit 402, an authenticated person information providing control unit 403, and a storage unit 404.

The communication control unit 401 is means for controlling communication with other apparatuses. For example, the communication control unit 401 receives data (packets) from the authentication terminal 20. In addition, the communication control unit 401 transmits data to the authentication terminal 20. The communication control unit 401 gives data received from other apparatuses to other processing modules. The communication control unit 401 transmits data acquired from other processing modules to other apparatuses. In this way, other processing modules transmit and receive data to and from other apparatuses via the communication control unit 401. The communication control unit 401 includes a function as a receiving unit that receives data from other apparatuses and a function as a transmitting unit that transmits data to other apparatuses.

The authenticated person information registration control unit 402 is means for controlling registration regarding information on an authenticated person. For example, the user information acquisition registration control unit 402 acquires a user ID, biometric information and determining data of a user when the user performs a predetermined action using the terminal 10 on a home page provided by the server apparatus 30.

Figure 17:
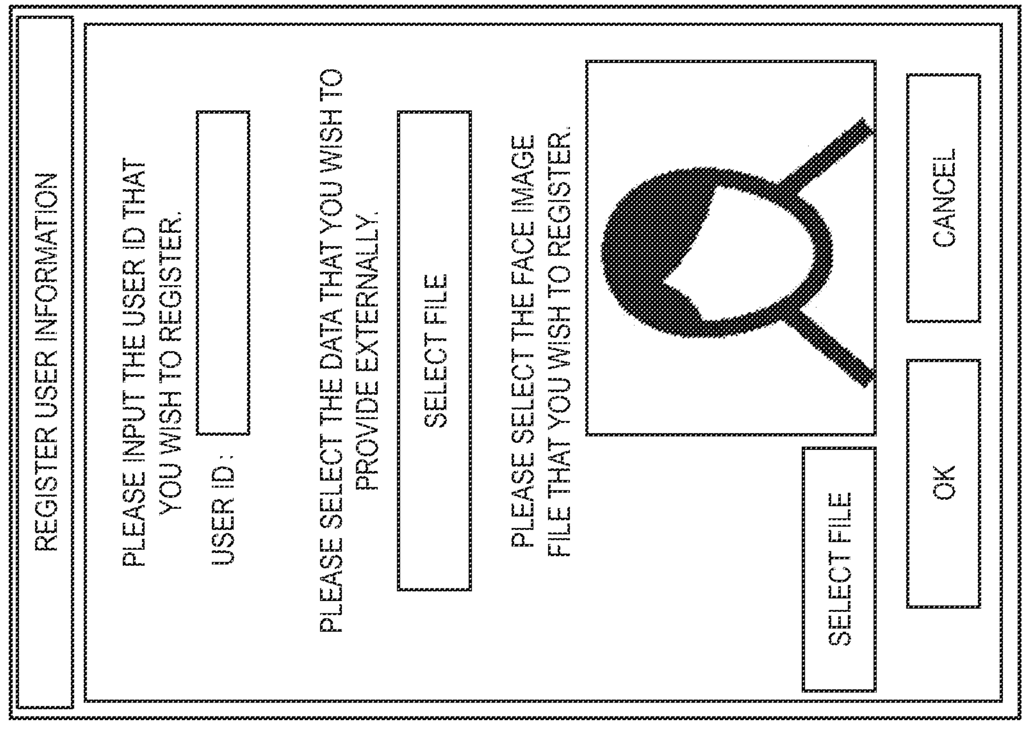
FIG. 17 is a diagram illustrating an example of the terminal display according to the second example embodiment.

For example, the user information acquisition registration control unit 402 displays a GUI as shown in FIG. 17 on the terminal 10 and acquires the user ID, biometric information (face image), and determining data of the user. The authenticated person information registration control unit 402 generates a feature value from the acquired face image. The authenticated person information registration control unit 402 stores correspondingly the user ID, the generated feature value (biometric information), and the data for determining whether or not to provide service in the authenticated person information database (see FIG. 18).

The authenticated person information providing control unit 403 is means for processing a request for providing information on authenticated person from the authentication terminal 20. When authenticated person information providing control unit 403 receives the request for providing information on authenticated person, the authenticated person information providing control unit 403 searches the authenticated person information database using a user ID included in the request as a key, and determines corresponding biometric information and determining data.

If biometric information and determining data corresponding to the user ID exist, the authenticated person information providing control unit 403 transmits a positive response that includes the biometric information and the determining data to the authentication terminal 20. If biometric information and determining data corresponding to the user ID do not exist, the authenticated person information providing control unit 403 transmits a negative response indicating that fact to the authentication terminal 20.

Storage unit 404 is means for storing information necessary for an operation of the server apparatus 30. The authenticated person information database is established in the storage unit 404.

Figure 19:
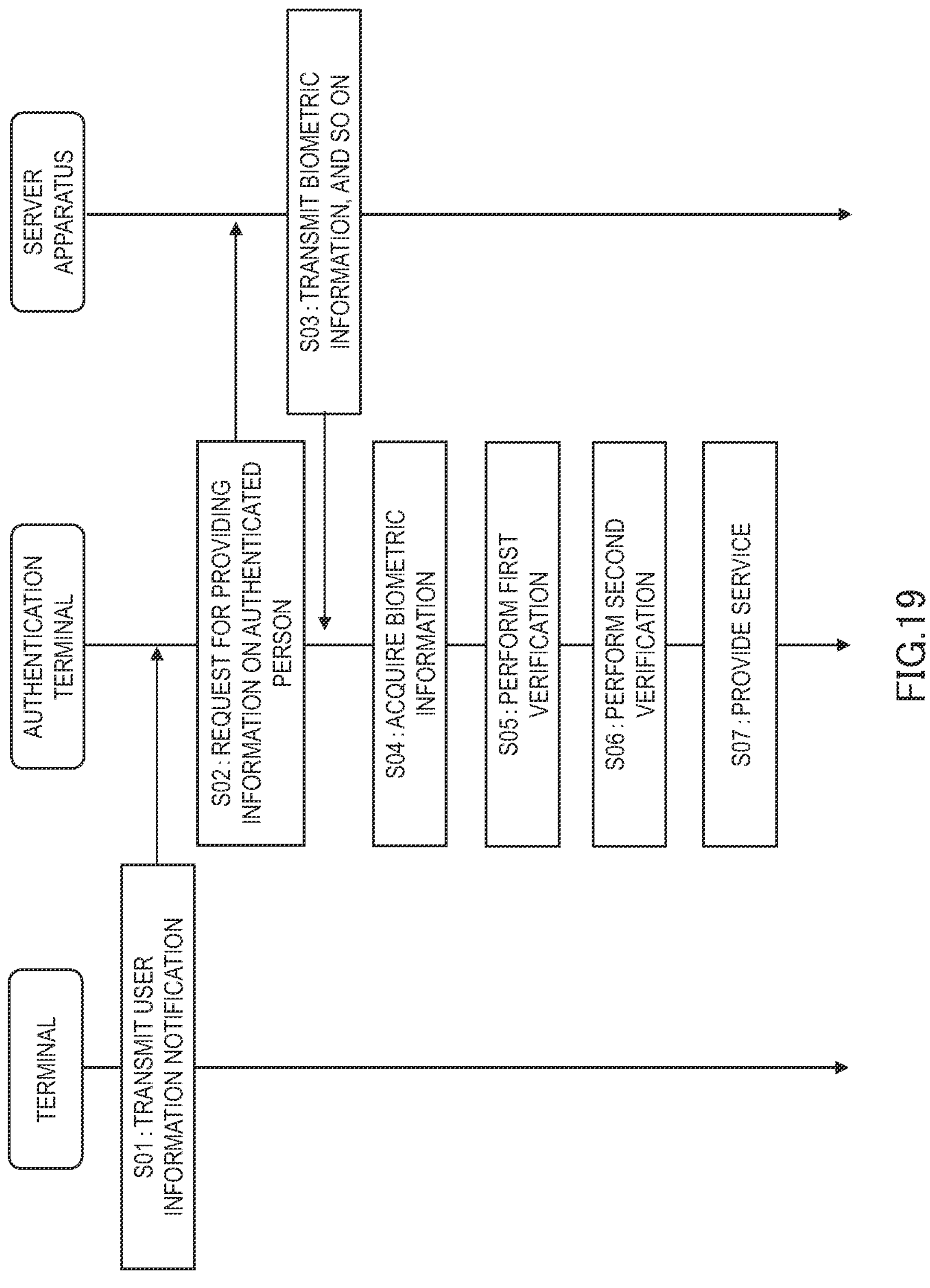
FIG. 19 is a sequence diagram illustrating an example of an operation in the authentication system according to the second example embodiment.

FIG. 19 is a sequence diagram illustrating an example of an operation of the authentication system according to the second example embodiment. Referring to FIG. 19, the operation of the authentication system according to the second example embodiment will be described.

When the terminal 10 and the authentication terminal 20 start communicating, the terminal 10 transmits a user information notification to the authentication terminal 20 that includes a user ID (step S01).

The authentication terminal 20 transmits the user ID included in the user information notification to the server apparatus 30. The authentication terminal 20 transmits a request for providing information on authenticated person including the user ID to the server apparatus 30 (step S02).

The server apparatus 30 searches the authenticated person information database using the user ID as a key, and determines a corresponding biometric information and determining data. The server apparatus 30 transmits the determined biometric information and determining data to the authentication terminal 20 (step S03).

When the user arrives at the authentication terminal 20, the authentication terminal 20 acquires biometric information of the user (step S04).

The authentication terminal 20 performs a first verification using the acquired biometric information and the biometric information notified by the server apparatus 30 (biometric information stored in the database of person to be matched) (step S05).

If the first verification has been successful, the authentication terminal 20 verifies a validity of the determining data of the user (perform a second verification; step S06).

The authentication terminal 20 provides a service to a person who has been successfully authenticated, while outputting a message based on results of the first verification and the second verification (step S07).

As described above, in the second example embodiment that uses the server apparatus 30, the biometric information and the determining data necessary for the authentication processing are transmitted to the authentication terminal 20. The authentication terminal 20 performs the first verification and the second verification using information (biometric information and determining data) acquired from the server apparatus 30. In the second example embodiment as well, the authentication terminal 20 can change an action according to results of the first verification and the second verification, and can provide appropriate information to a person who has failed in authentication.

Figure 20:
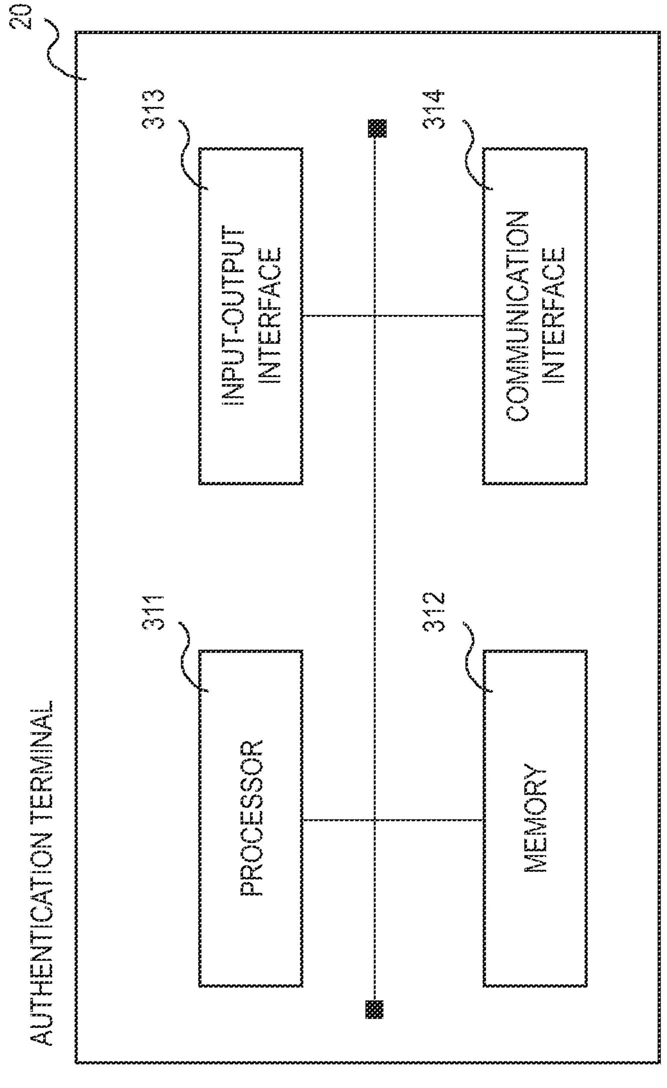
FIG. 20 is a diagram illustrating an example of a hardware configuration of an authentication terminal for the present application.

Next, a hardware configuration of an individual apparatus that constitutes the authentication system will be described. FIG. 20 is a diagram illustrating an example of a hardware configuration of the authentication terminal 20.

The authentication terminal 20 can be configured by an information processing apparatus (a so-called computer) and has a configuration illustrated as an example in FIG. 20. For example, the authentication terminal 20 includes a processor 311, a memory 312, an input-output interface 313, a communication interface 314, etc. The components such as the processor 311 are connected to an internal bus, and so on so that these components can communicate with each other.

The hardware configuration of the authentication terminal 20 is not limited to the configuration illustrated in FIG. 20. The authentication terminal 20 may include hardware not illustrated or may be configured without the input-output interface 313 if desired. In addition, the number of components, such as the number of processors 311, included in the authentication terminal 20 is not limited to the example illustrated in FIG. 20. For example, a plurality of processors 311 may be included in the authentication terminal 20. In addition, the authentication terminal 20 may include a camera device for photographing an authenticated person and a gate, and so on, that restricts a user from passing through.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display device and an input device not illustrated. For example, the display device is a liquid crystal display or the like. For example, the input device is a device, such as a keyboard, a mouse or a touch panel which receives user operations.

The communication interface 314 is a circuit, a module, or the like for performing communication with other apparatuses. For example, the communication interface 314 includes a NIC (Network Interface Card) or the like.

The functions of the authentication terminal 20 are realized by various kinds of processing modules. The processing modules are realized, for example, by causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the terminal 10 and the server apparatus 30 can each be configured by an information processing apparatus, and the basic hardware configuration of the authentication terminal 20 is the same as that of the server apparatus 20. Thus, description of the basic hardware configuration of the terminal 10 and the server apparatus 30 will be omitted.

The authentication terminal 20 includes a computer and can realize its functions by causing the computer to execute a program. In addition, the authentication terminal 20 executes a control method of the authentication terminal 20 by using the program.

Variations

The configurations, operations, etc. of the authentication systems according to the above example embodiments are examples and do not limit the present system configuration, etc.

In the above example embodiments, a case is described when the authentication terminal 20 is a gate apparatus installed at an airport and a service is provided (permit to pass through the gate) to a user who has successfully authenticated. However, the authentication terminal 20 may be a terminal installed at a facility other than an airport. For example, the authentication terminal 20 may be a terminal installed at an event venue and the authentication terminal 20 may be a terminal that permits a user to pass through who presents a valid ticket as determining data. Alternatively, the authentication terminal 20 may be a check-in terminal installed at an airport, and may provide a check-in procedure to a user who presents a valid passport and airline ticket as determining data. In this way, the authentication terminal 20 can be any device that provides a service based on determining data.

With reference to FIGS. 11A and 11B, and so on, the above example embodiments describe guiding a user who has failed a second verification using determining data a procedure, and so on, to receive a service. Here, as described above, more detailed contents shown in FIG. 11A may be included. For example, taking an acquisition of a negative certificate as an example, the authentication terminal 20 may display information necessary to acquire the negative certificate, such as a location and time (time zone) to be inspected to acquire the negative certificate (see FIG. 11B).

Alternatively, the authentication terminal 20 may collaborate with a medical institution that performs a PCR (Polymerase Chain Reaction) test, or the like, and allow a user who does not possess the negative certificate to make an appointment for the PCR test, or the like.

Figure 21:
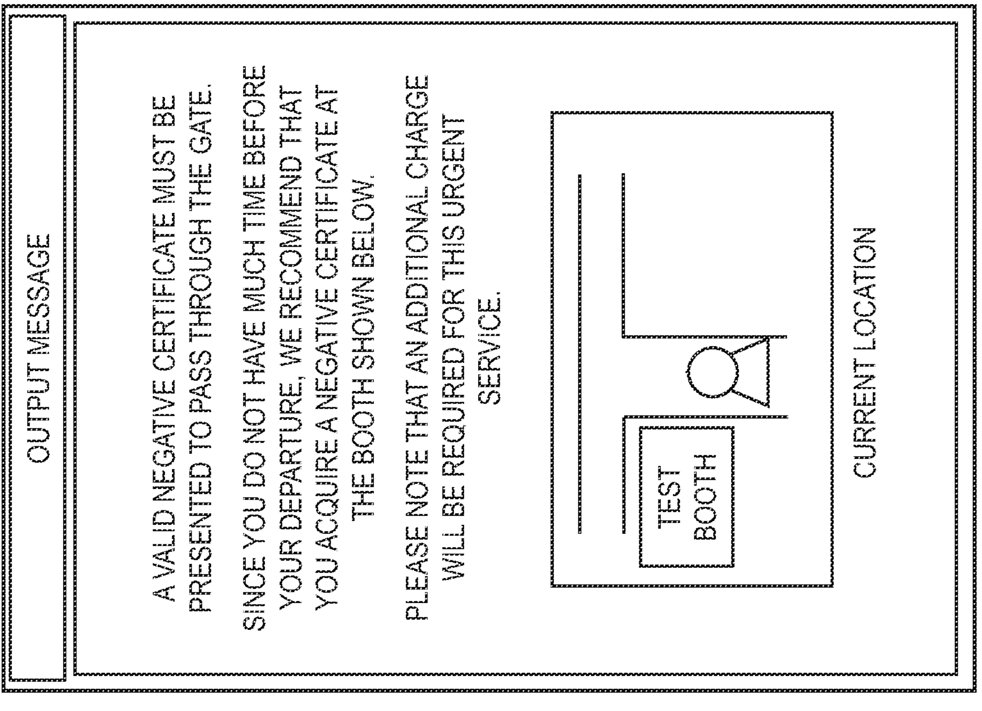
FIG. 21 is a diagram illustrating an example of a display of an authentication terminal according to a variation of the present application.

Alternatively, the authentication terminal 20 may collaborate with a DCS (Departure Control System) managed by an airline company and change contents of guidance based on a boarding schedule, and so on, of a person who has failed in authentication. More specifically, the authentication terminal 20 transmits biometric information of a user (a person who has failed in authentication) to the above DCS and acquires corresponding information of a boarding pass (for example, departure time). The authentication terminal 20 provides guidance regarding a predetermined normal testing agency to a user who has enough time to depart. On the other hand, for a user who does not have enough time to depart, the authentication terminal 20 provides guidance regarding a testing agency that performs a test that requires an additional fee but provides a result of the test as soon as possible (see FIG. 21). In this way, when the authentication terminal 20 provides guidance on a procedure, and so on, for receiving a service to a user who has failed in verification using determining data, the authentication terminal 20 may change contents of the guidance based on information on the user.

In the above example embodiments, a case in which the terminal 10 transmits one piece of determining data to the authentication terminal 20 is described. However, the terminal 10 may transmit a plurality of determining data (multiple types of determining data) to the authentication terminal 20. For example, the terminal 10 may transmit a vaccination certificate and a negative certificate to the authentication terminal 20. In this case, the authentication terminal 20 sets a result of authentication of a user (authenticated person) to success when the plurality of determining data that has been acquired is valid.

The authentication terminal 20 (the user information processing unit 302) may access the database of person to be matched periodically or at predetermined timing and delete an entry that has been registered after a predetermined period of time has elapsed.

The above example embodiments describe a case in which the authentication terminal 20 performs a second verification using determining data. However, a verification using the determining data (verification regarding a validity of the determining data) may be performed by a device other than the authentication terminal 20. For example, the authentication terminal 20 may transmit determining data to an external server and request a verification regarding a validity of the determining data (the external server may perform a second validation). The authentication terminal 20 receives and internally stores a result of the verification from the external server before the user arrives at own terminal (before a first verification is performed). The authentication terminal 20 performs the first verification at the timing when the user arrives at own terminal, and determines an action to the user according to a result of the first verification and the result of the second verification that has already been acquired. In this way, the authentication terminal 20 changes the action to be taken to the user according to a method that has failed in verification, even when the authentication terminal 20 requests the external server to verify the determining data. An authentication (a verification using determining data) is performed at the external server, and the authentication terminal 20 may receive a result of the authentication and output a message, or the like, according to the method that has failed in the verification. That is, a population related to the result of the verification result may be moved from the external server to an authentication terminal in advance, and the authentication terminal 20 may make the population related to the result of the verification as a result of final authentication according to the first verification result.

The above example embodiments describe a case in which the terminal 10 and the authentication terminal 20 communicate via Bluetooth (registered trademark). At that time, the authentication terminal 20 may transmit and receive a radio wave of the Bluetooth (registered trademark) using a transmitter and receiver that has no limitation on a location for installation. Specifically, the transmitter and receiver may be installed at a location farther than a communication distance of the Bluetooth (registered trademark), and the authentication terminal 20 may communicate with the terminal 10 using the transmitter and receiver.

The above example embodiments describe a case in which the authentication terminal 20 performs a 1-to-N authentication using biometric information of a user who has arrived at own terminal and biometric information stored in the database of person to be matched. However, the authentication terminal 20 may perform a one-to-one authentication using biometric information of a user on the premise that the user arrives at own terminal in the order in which a user information notification is transmitted. In this case, the authentication terminal 20 may check a legitimacy regarding an owner of the terminal 10 by performing the one-to-one authentication using biometric information acquired when the user arrived at own terminal and biometric information stored most recently in the database of person to be matched. Note that the authentication terminal 20 deletes an entry used for the matching processing in the database of person to be matched after the authentication processing is performed. In this way, accuracy of authentication is improved by checking the legitimacy of the owner of the terminal 10 by means of the one-to-one authentication.

In the second example embodiment, instead of the authentication terminal 20 performing biometric authentication (matching processing using biometric information), the server apparatus 30 may perform the matching processing. In this case, the authentication terminal 20 acquires biometric information of a user who has arrived at own terminal and transmits the acquired biometric information to the server apparatus 30. The server apparatus 30 transmits a user ID of the user identified by the matching processing to the authentication terminal 20. The authentication terminal 20 determines that a legitimacy regarding an owner of the terminal 10 has been checked in response to receiving the user ID.

The terminal 10 and the authentication terminal 20 may communicate with each other by means other than Bluetooth (registered trademark). For example, the terminal 10 and the authentication terminal 20 may communicate using ZigBee (registered trademark). Alternatively, the terminal 10 and the authentication terminal 20 may communicate via a standard compatible with a wireless LAN (Local Area Network).

For example, while the above example embodiments have been described based on a case in which the database of person to be matched is established in the authentication terminal 20, the database of person to be matched may be established in an externally installed database server. That is, some functions of the authentication terminal 20 may be implemented in another server. More specifically, the "authentication unit (authentication means)", and so on, described above, can be implemented in any of the apparatuses included in the system.

In the above example embodiments, a case is described in which a feature value generated from a face image is transmitted as biometric information from the terminal 10 to the authentication terminal 20. However, a face image may be transmitted as biometric information from the terminal 10 to the authentication terminal 20. In this case, the authentication terminal 20 may generate the feature value from the face image and register the feature value in the database of person to be matched.

While the data exchange between the terminal 10, the authentication terminal 20 and the server apparatus 30 is not limited to any particular mode, data exchanged between these apparatuses may be encrypted. It is desirable that the biometric information and so on are transmitted and received between these apparatuses and encrypted data is transmitted and received in order to properly protect this information. In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the contents of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to authentication systems that authenticate users.

A part or the entirety of the example embodiments described above may be described as in the following supplementary notes, but is not limited to the followings.

Supplementary Note 1

An authentication terminal, including:

a first acquisition unit that acquires first biometric information of a user and determining data to determine whether or not to provide a service to the user from another apparatus when a distance between own terminal and the user reaches a first distance;

a second acquisition unit that acquires second biometric information of the user when the distance between the own terminal and the user reaches a second distance;

an authentication unit that authenticates the user based on a first verification using the first biometric information and the second biometric information and a second verification using the determining data; and a service providing unit that provides the service to a person who has been successfully authenticated when a result of an authentication is successful, and determines an action to be taken for a person who has failed in the authentication according to which of the first verification or the second verification has failed when the result of the authentication is unsuccessful.

Supplementary Note 2

The authentication terminal according to supplementary note 1, wherein the first acquisition unit acquires the first biometric information and the determining data from a terminal possessed by the user.

Supplementary Note 3

The authentication terminal according to supplementary note 2, wherein the authentication unit performs a matching processing using the first biometric information and the second biometric information as the first verification.

Supplementary Note 4

The authentication terminal according to supplementary note 2 or 3, wherein the authentication unit determines a validity of the determining data as the second verification.

Supplementary Note 5

The authentication terminal according to any one of supplementary notes 2 to 4, wherein the service providing unit that notifies a person who has been predetermined of an unauthorized use of the terminal by the person who has failed in the authentication, when the first verification is unsuccessful.

Supplementary Note 6

The authentication terminal according to any one of supplementary notes 2 to 5, wherein the service providing unit provides a guidance the person who has failed in the authentication through a procedure necessary to receive the service, when the first verification is successful and the second verification is unsuccessful.

Supplementary Note 7

The authentication terminal according to any one of supplementary notes 2 to 6, wherein the first acquisition unit communicates with the terminal by means of short-range wireless communication.

Supplementary Note 8

The authentication terminal according to supplementary note 1, wherein the first acquisition unit acquires the first biometric information and the determining data from a server apparatus that stores the first biometric information of the user and the determining data.

Supplementary Note 9

The authentication terminal according to any one of supplementary notes 1 to 8, wherein the biometric information is a face image or a feature value generated from the face image.

Supplementary Note 10

A system, including:

a terminal possessed by a user; and an authentication terminal, wherein the authentication terminal, including:

a first acquisition unit that acquires first biometric information of the user and determining data to determine whether or not to provide a service to the user from the terminal when a distance between own terminal and the user reaches a first distance;

a second acquisition unit that acquires second biometric information of the user when the distance between the own terminal and the user reaches a second distance;

an authentication unit that authenticates the user based on a first verification using the first biometric information and the second biometric information and a second verification using the determining data; and a service providing unit that provides the service to a person who has been successfully authenticated when a result of an authentication is successful, and determines an action to be taken for a person who has failed in the authentication according to which of the first verification or the second verification has failed when the result of the authentication is unsuccessful.

Supplementary Note 11

The system according to supplementary note 10, wherein the terminal transmits the first biometric information and the determining data to the authentication terminal when the terminal starts communication with the authentication terminal by a short-range wireless communication means.

Supplementary Note 12

The system according to supplementary note 11, wherein the terminal prompts the user to enable the short-range wireless communication means when a distance between the terminal and the authentication terminal reaches a third distance.

Supplementary Note 13

A control method of an authentication terminal, the control method including:

acquiring first biometric information of a user and determining data to determine whether or not to provide a service to the user from another apparatus when a distance between own terminal and the user reaches a first distance;

acquiring second biometric information of the user when the distance between the own terminal and the user reaches a second distance;

authenticating the user based on a first verification using the first biometric information and the second biometric information and a second verification using the determining data; and providing the service to a person who has been successfully authenticated when a result of an authentication is successful, and determining an action to be taken for a person who has failed in the authentication according to which of the first verification or the second verification has failed when the result of the authentication is unsuccessful.

Supplementary Note 14

A computer-readable storage medium, storing a program causing a computer mounted on an authentication terminal to perform processing for:

acquiring first biometric information of a user and determining data to determine whether or not to provide a service to the user from another apparatus when a distance between own terminal and the user reaches a first distance;

acquiring second biometric information of the user when the distance between the own terminal and the user reaches a second distance;

authenticating the user based on a first verification using the first biometric information and the second biometric information and a second verification using the determining data; and providing the service to a person who has been successfully authenticated when a result of an authentication is successful, and determining an action to be taken for a person who has failed in the authentication according to which of the first verification or the second verification has failed when the result of the authentication is unsuccessful.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST

10 terminal
20 authentication terminal
30 server apparatus
100 authentication terminal
101 first acquisition unit
102 second acquisition unit
103 authentication unit
104 service providing unit
201 communication control unit
202 electronic wallet control unit
203 biometric information acquisition unit
204 user information notification unit
205 storage unit
206 authenticated person information registration unit
301 communication control unit
302 user information processing unit
303 biometric information acquisition unit
304 authentication unit
305 service providing unit
306 storage unit
311 processor
312 memory
313 input-output interface
314 communication interface
401 communication control unit
402 authenticated person information registration control unit
403 authenticated person information providing control unit
404 storage unit

What is claimed is:

1. An authentication terminal, comprising:

at least one memory storing a set of instructions; and at least one processor configured to execute the set of instructions to:

acquire first biometric information of a user and determining data to determine whether or not to provide a service to the user from another apparatus;

acquire second biometric information of the user;

authenticate the user based on a first verification using the first biometric information and the second biometric information and a second verification using the determining data;

provide the service to a person who has been successfully authenticated in a case where a result of an authentication is successful, and determine an action to be taken for a person who has failed in the authentication according to which of the first verification or the second verification has failed in a case where the result of the authentication is unsuccessful; and determine a validity of the determining data as the second verification.

2. The authentication terminal according to claim 1, wherein the at least one processor is further configured to execute the set of instructions to:

acquire the first biometric information and the determining data from a terminal possessed by the user in a case where a distance between own terminal and the user reaches a first distance; and acquire second biometric information of the user in a case where the distance between the own terminal and the user reaches a second distance.

3. The authentication terminal according to claim 2, wherein the at least one processor is further configured to execute the set of instructions to perform a matching processing using the first biometric information and the second biometric information as the first verification.

4. The authentication terminal according to claim 2, wherein the at least one processor is further configured to execute the set of instructions to notify a person who has been predetermined of an unauthorized use of the terminal by the person who has failed in the authentication, in a case where the first verification is unsuccessful.

5. The authentication terminal according to claim 2, wherein the at least one processor is further configured to execute the set of instructions to provide a guidance the person who has failed in the authentication through a procedure necessary to receive the service, in a case where the first verification is successful and the second verification is unsuccessful.

6. The authentication terminal according to claim 2, wherein the at least one processor is further configured to execute the set of instructions to communicate with the terminal by means of short-range wireless communication.

7. The authentication terminal according to claim 1, wherein the at least one processor is further configured to execute the set of instructions to acquire the first biometric information and the determining data from a server apparatus that stores the first biometric information of the user and the determining data.

8. The authentication terminal according to claim 1, wherein the biometric information is a face image or a feature value generated from the face image.

9. A system, comprising:
- a terminal possessed by a user; and
- an authentication terminal,
- wherein the authentication terminal comprises:
  - at least one memory storing a set of instructions; and
  - at least one processor configured to execute the set of instructions to:
    - acquire first biometric information of the user and determining data to determine whether or not to provide a service to the user from the terminal;
    - acquire second biometric information of the user;
    - authenticate the user based on a first verification using the first biometric information and the second biometric information and a second verification using the determining data;
    - provide the service to a person who has been successfully authenticated in a case where a result of an authentication is successful, and determine an action to be taken for a person who has failed in the authentication according to which of the first verification or the second verification has failed in a case where the result of the authentication is unsuccessful; and
    - determine a validity of the determining data as the second verification.

10. The system according to claim 9, wherein the terminal transmits the first biometric information and the determining data to the authentication terminal in a case where the terminal starts communication with the authentication terminal by a short-range wireless communication means.

11. The system according to claim 10, wherein the terminal prompts the user to enable the short-range wireless communication means in a case where a distance between the terminal and the authentication terminal reaches a predetermined distance.

12. A control method of an authentication terminal, the control method comprising:
- acquiring first biometric information of a user and determining data to determine whether or not to provide a service to the user from another apparatus;
- acquiring second biometric information of the user;
- authenticating the user based on a first verification using the first biometric information and the second biometric information and a second verification using the determining data;
- providing the service to a person who has been successfully authenticated in a case where a result of an authentication is successful, and determining an action to be taken for a person who has failed in the authentication according to which of the first verification or the second verification has failed in a case where the result of the authentication is unsuccessful; and
- determining a validity of the determining data as the second verification.

* * * * *